US012750436B2

(12) United States Patent
Jin et al.

(10) Patent No.: US 12,750,436 B2
(45) Date of Patent: Sep. 29, 2026

(54) ELECTRONIC DEVICE, METHOD, AND STORAGE MEDIUM FOR IDENTIFYING STATE OF ELECTRONIC DEVICE USING SENSOR

(71) Applicant: SAMSUNG ELECTRONICS CO., LTD., Suwon-si (KR)

(72) Inventors: Seoyoung Jin, Suwon-si (KR); Oheon Kwon, Suwon-si (KR); Kyusung Kim, Suwon-si (KR); Byungwoo Min, Suwon-si (KR); Jeongwon Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 321 days.

(21) Appl. No.: 18/640,679

(22) Filed: Apr. 19, 2024

(65) Prior Publication Data

US 2025/0023965 A1 Jan. 16, 2025

Related U.S. Application Data

(63) Continuation of application No. PCT/KR2024/004925, filed on Apr. 12, 2024.

(30) Foreign Application Priority Data

Jul. 11, 2023 (KR) ........................ 10-2023-0090106
Jul. 20, 2023 (KR) ........................ 10-2023-0094917

(51) Int. Cl.
*H04M 1/02* (2006.01)

(52) U.S. Cl.
CPC ...... *H04M 1/0216* (2013.01); *H04M 2250/12* (2013.01)

(58) Field of Classification Search
CPC ........................ H04M 1/0216; H04M 2250/12
See application file for complete search history.

(56) References Cited

U.S. PATENT DOCUMENTS 5,137,677 A 8/1992 Murata
9,183,770 B2 11/2015 Lee et al.
(Continued)

FOREIGN PATENT DOCUMENTS

CN 115145428 A 10/2022
CN 118463795 A 8/2024
(Continued)

OTHER PUBLICATIONS

International Search Report and Written Opinion (PCT/ISA/210 and PCT/ISA/237) dated Aug. 16, 2024, issued by International Searching Authority for International Application No. PCT/KR2024/004925.

*Primary Examiner* — Lewis G West
(74) *Attorney, Agent, or Firm* — Sughrue Mion, PLLC

(57) ABSTRACT

An electronic device includes a first housing; a second housing, a hinge foldably connecting the first housing and the second housing to each other along a folding axis, a plurality of sensors including a hall sensor and at least one inertial sensor; and at least one processor. The at least one processor is configured to: identify, using the hall sensor, first information indicating that a state of the electronic device is a first state, based on identifying the first information, identify, using the at least one inertial sensor, second information indicating the state of the electronic device, based on identifying that the first information corresponds to the second information, identify the state of the electronic device as the first state, and based on identifying that the first information is different from the second information, identify the state of the electronic device based on the second information.

20 Claims, 17 Drawing Sheets

(56) References Cited

U.S. PATENT DOCUMENTS

| | | | | |
|---|---|---|---|---|
| 9,747,868 | B2 | 8/2017 | Lee et al. | |
| 9,794,380 | B2 | 10/2017 | Kim et al. | |
| 11,216,040 | B2 | 1/2022 | Park et al. | |
| 11,300,995 | B2 | 4/2022 | Eom et al. | |
| 11,551,595 | B2 | 1/2023 | Yoon et al. | |
| 12,014,104 | B2 | 6/2024 | Jin et al. | |
| 12,174,674 | B2 | 12/2024 | Kwon et al. | |
| 2013/0274926 | A1* | 10/2013 | Tomimori | G06F 1/16 700/275 |
| 2014/0202014 | A1* | 7/2014 | Choi | G06F 1/1694 33/333 |
| 2017/0192478 | A1* | 7/2017 | Mercer | G01D 5/142 |
| 2019/0215765 | A1* | 7/2019 | Ramasamy | H04W 52/0206 |
| 2019/0273525 | A1* | 9/2019 | Wu | H04W 52/30 |
| 2020/0136668 | A1* | 4/2020 | Chu | G06F 1/1616 |
| 2020/0210132 | A1* | 7/2020 | Becze | H04M 1/0216 |
| 2021/0041912 | A1* | 2/2021 | Eom | G06F 3/017 |
| 2021/0075459 | A1* | 3/2021 | Noh | G06F 3/041 |
| 2021/0160356 | A1* | 5/2021 | Woo | G06F 1/1641 |
| 2021/0185621 | A1* | 6/2021 | Krenz | H04W 52/367 |
| 2021/0409531 | A1* | 12/2021 | Shim | H04N 23/53 |
| 2022/0113767 | A1 | 4/2022 | Jung et al. | |
| 2022/0215815 | A1* | 7/2022 | Kim | G09G 5/14 |
| 2022/0308638 | A1 | 9/2022 | Peng | |
| 2023/0005402 | A1 | 1/2023 | Peng et al. | |
| 2023/0085568 | A1* | 3/2023 | Jin | G06F 1/1677 455/575.1 |
| 2023/0176803 | A1* | 6/2023 | Jin | G06F 3/1431 345/1.3 |
| 2023/0269316 | A1* | 8/2023 | Kim | H04M 1/0243 455/575.3 |
| 2024/0098654 | A1* | 3/2024 | Bertizzolo | H04W 52/267 |
| 2024/0146831 | A1* | 5/2024 | Ye | H04M 1/0243 |
| 2025/0021289 | A1* | 1/2025 | Jin | G06F 3/1423 |
| 2025/0173108 | A1* | 5/2025 | Kim | G06F 1/1616 |

FOREIGN PATENT DOCUMENTS

| | | | |
|---|---|---|---|
| KR | 10-2081931 | B1 | 2/2020 |
| KR | 10-2020-0138931 | A | 12/2020 |
| KR | 10-2185486 | B1 | 12/2020 |
| KR | 10-2021-0017038 | A | 2/2021 |
| KR | 10-2022-0017078 | A | 2/2022 |
| KR | 10-2023-0027555 | A | 2/2023 |
| KR | 10-2703500 | B1 | 9/2024 |

* cited by examiner

ELECTRONIC DEVICE, METHOD, AND STORAGE MEDIUM FOR IDENTIFYING STATE OF ELECTRONIC DEVICE USING SENSOR

CROSS-REFERENCE TO RELATED APPLICATIONS

This application is a by-pass continuation application of International Application No. PCT/KR2024/004925, filed on Apr. 12, 2024, which is based on and claims priority to Korean Patent Application Nos. 10-2023-0090106, filed on Jul. 11, 2023, and 10-2023-0094917, filed on Jul. 20, 2023, in the Korean Intellectual Property Office, the disclosures of which are incorporated by reference herein their entireties.

BACKGROUND

1. Field

The disclosure relates to an electronic device, a method, and a storage medium for identifying a state of an electronic device using a sensor.

2. Description of Related Art

With the development of technology, an electronic device including a flexible display has been developed. For example, the flexible display included in the electronic device may be foldable. The electronic device may display screens divided along a folding axis.

The above-described information may be provided as related art for the purpose of helping to understand the disclosure. No claim or determination is raised as to whether any of the above-described information may be applied as related art related to the disclosure.

SUMMARY

According to an aspect of the disclosure, an electronic device includes: a first housing; a second housing; a hinge foldably connecting the first housing and the second housing to each other along a folding axis; a plurality of sensors including a hall sensor and at least one inertial sensor; and at least one processor. The at least one processor is configured to: identify, using the hall sensor, first information indicating that a state of the electronic device is a first state, based on identifying the first information, identify, using the at least one inertial sensor, second information indicating the state of the electronic device, identify whether the first information corresponds to or is different from the second information, based on identifying that the first information corresponds to the second information, identify the state of the electronic device as the first state, and based on identifying that the first information is different from the second information, identify the state of the electronic device based on the second information.

The electronic device may further include: a first display including a first display area corresponding to a first surface of the first housing and a second display area corresponding to a surface of the second housing, wherein the first display area and the second display area are divided along the folding axis, and a second display including a display area corresponding to a second surface of the first housing opposite to the first surface of the first housing.

The at least one processor may be further configured to: identify the second information based on data obtained using the at least one inertial sensor, identify that the state of the electronic device indicated by the second information is different from a plurality of states including the first state, and based on identifying that the state of the electronic device indicated by the second information is different from the plurality of states, identify the state of the electronic device as the first state.

The plurality of states may respectively correspond to a plurality of angles between the first housing and the second housing.

The plurality of states may further include a second state, a third state, and a fourth state. The first state may correspond to a first angle between a first direction in which the first display area faces and a second direction in which the second display area faces, the first angle being greater than or equal to a first predetermined angle. The second state may correspond to a second angle between the first direction and the second direction, the second angle being greater than or equal to a second predetermined angle and less than the first predetermined angle. The third state may correspond to a third angle between the first direction and the second direction, the third angle being greater than or equal to a third predetermined angle and less than the second predetermined angle. The fourth state may correspond to a fourth angle between the first direction and the second direction, the fourth angle being less than the third predetermined angle.

The at least one processor may be further configured to: based on identifying the state of the electronic device as one of the first state and the second state, activate the second display, and based on identifying the state of the electronic device as one of the third state and the fourth state, activate the first display.

The at least one processor may be further configured to: based on identifying the state of the electronic device as one of the third state and the fourth state, deactivate the hall sensor, and based on the state of the electronic device being changed from one of the third state and the fourth state to the second state, activate the hall sensor.

The at least one inertial sensor may include a first inertial sensor in the first housing and a second inertial sensor in the second housing. The at least one processor may be further configured to, based on identifying the state of the electronic device as the first state, change at least one axis among a plurality of axes related to the first inertial sensor.

The at least one processor may be further configured to change a first direction of the at least one axis to a second direction that is opposite to the first direction.

The at least one processor may be further configured to change, using the first inertial sensor, a display mode of the second display while the state of the electronic device is the first state.

The at least one processor may be further configured to, based on identifying the state of the electronic device as the first state, activate, among the plurality of sensors, at least one sensor configured to be used for the second display.

The plurality of sensors may include a first illuminance sensor in a direction that the first display faces and a second illuminance sensor in a direction that the second display faces. The at least one processor may be further configured to, based on identifying the state of the electronic device as the first state, activate the second illuminance sensor and deactivate the first illuminance sensor.

The at least one processor may be further configured to, based on identifying that the state of the electronic device indicated by the second information is the first state, identify that the first information corresponds to the second information.

The at least one processor may be further configured to: identify, using the at least one inertial sensor, a posture of the electronic device, identify the first information while the posture of the electronic device is a designated posture, and based on the first information, identify the state of the electronic device as the first state.

The at least one processor may be further configured to: identify the first information while the posture of the electronic device is different from the designated posture, and based on identifying the first information, obtain, using the at least one inertial sensor, the second information indicating the state of the electronic device.

According to an aspect of the disclosure, a method of an electronic device includes: identifying, using a hall sensor of the electronic device, first information indicating that a state of the electronic device is a first state; based on identifying the first information, identifying, using at least one inertial sensor of the electronic device, second information indicating the state of the electronic device; identifying whether the first information corresponds to or is different from the second information; based on identifying that the first information corresponds to the second information, identifying the state of the electronic device as the first state; and based on identifying that the first information is different from the second information, identifying the state of the electronic device based on the second information.

The method may further include identifying, based on identifying that the state of the electronic device identified based on the second information is the first state, that the first information corresponds to the second information.

The method may further include: identifying, using the at least one inertial sensor, a posture of the electronic device; identifying the first information while the posture of the electronic device is a designated posture; and based on the first information, identifying the state of the electronic device as the first state.

The method may further include: identifying the first information while the posture of the electronic device is different from the designated posture; and based on identifying the first information, obtaining, using the at least one inertial sensor, the second information indicating the state of the electronic device.

According to an aspect of the disclosure, a non-transitory computer readable storage medium may store one or more programs. The one or more programs include instructions which, when being executed by at least one processor of an electronic device, cause the electronic device to: identify, using a hall sensor of the electronic device, first information indicating that a state of the electronic device is a first state; based on identifying the first information, identify, using at least one inertial sensor of the electronic device, second information indicating the state of the electronic device; identifying whether the first information corresponds to or is different from the second information; based on identifying that the first information corresponds to the second information, identify the state of the electronic device as the first state; and based on identifying that the first information is different from the second information, identify the state of the electronic device based on the second information.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
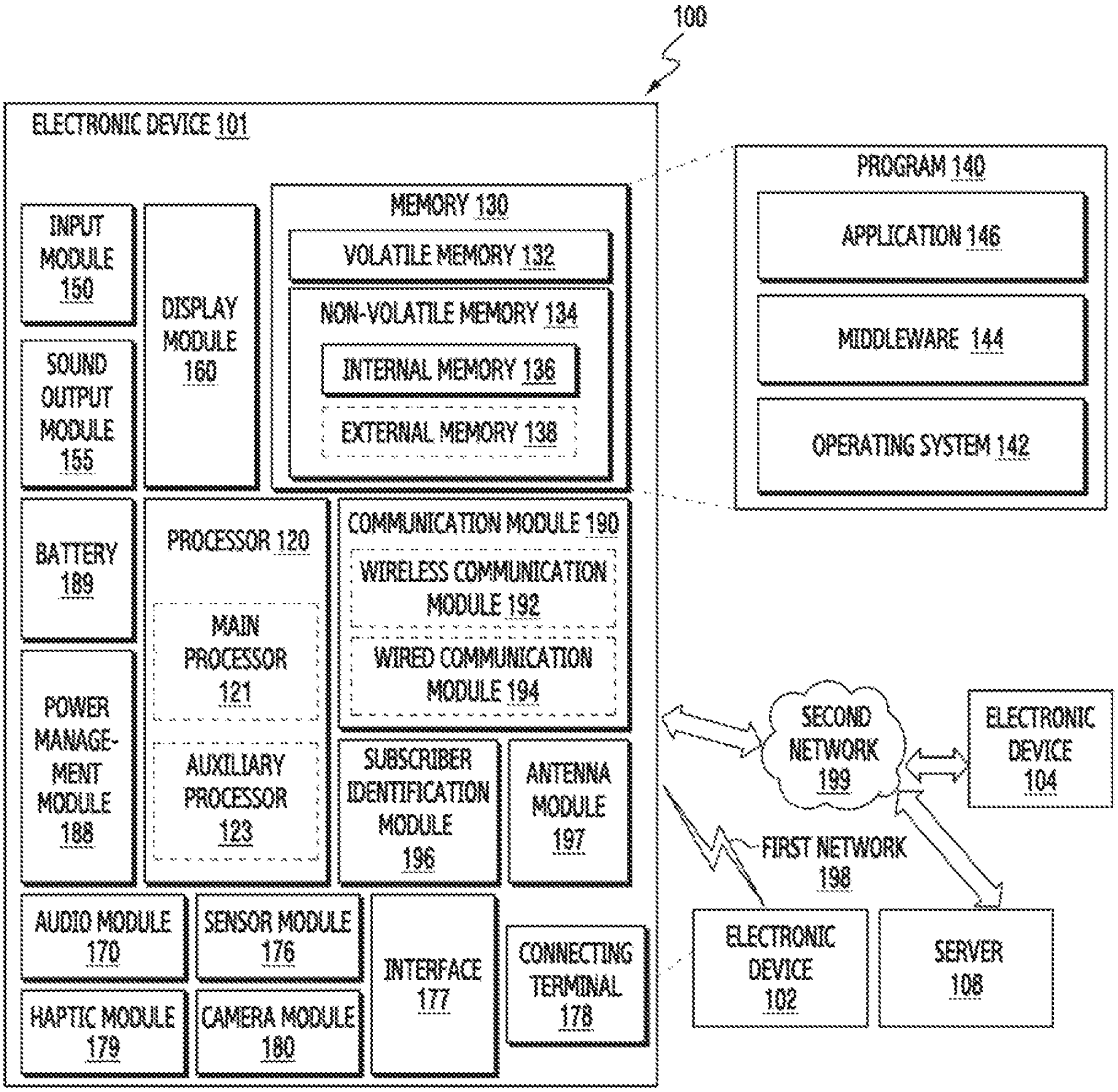
FIG. 1 is a block diagram of an electronic device in a network environment according to an embodiment.

Hereinafter, embodiments of the disclosure will be described in detail with reference to drawings so that those having ordinary knowledge in the art to which the disclosure belongs may easily implement it. However, the disclosure may be implemented in various different forms and is not limited to the embodiments described herein. In relation to the description of the drawings, identical or similar reference numerals may be used for identical or similar components. In addition, in the drawings and related descriptions, descriptions of well-known features and configurations may be omitted for clarity and brevity.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101.

The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
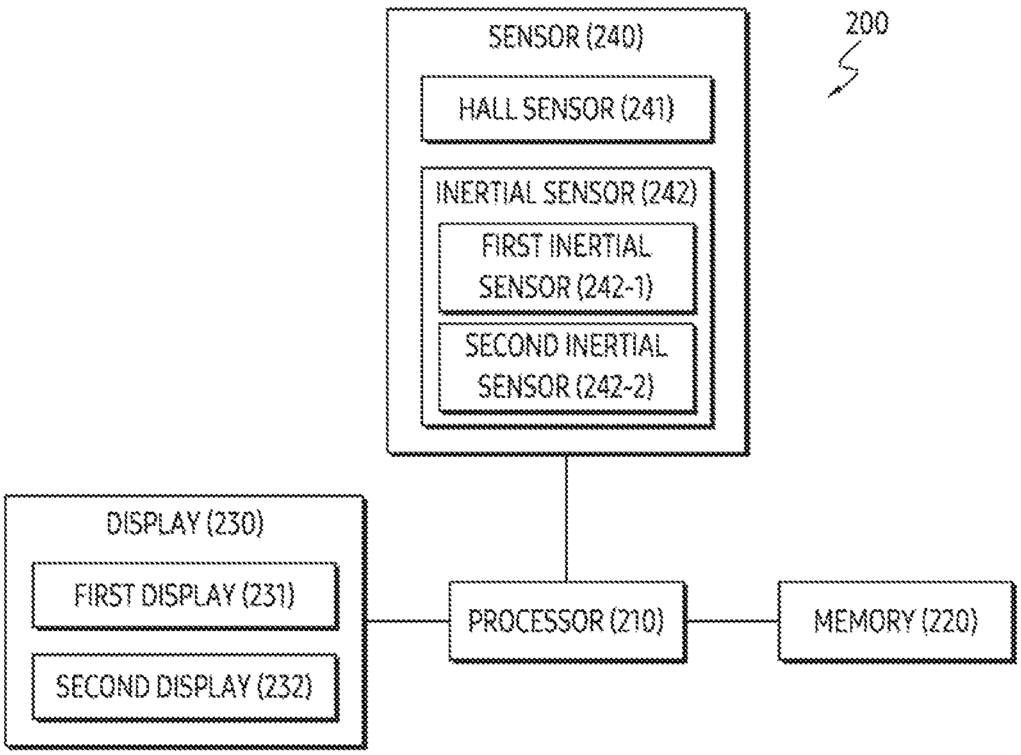
FIG. 2 illustrates an example of a simplified block diagram of an electronic device according to an embodiment.

FIG. 2 illustrates an example of a simplified block diagram of an electronic device according to an embodiment.

Referring to FIG. 2, an electronic device 200 may include some or all of components of an electronic device 101 illustrated in FIG. 1. For example, the electronic device 200 may correspond to the electronic device 101 of FIG. 1.

According to an embodiment, the electronic device 200 may include a processor 210, memory 220, a display 230, and/or a sensor 240. According to an embodiment, the electronic device 200 may include at least one of the processor 210, the memory 220, the display 230, and the sensor 240. For example, at least a portion of the processor 210, the memory 220, the display 230, or the sensor 240 may be omitted according to an embodiment. In an embodiment, the electronic device 200 may include various components in addition to the processor 210, the memory 220, the display 230, and the sensor 240.

According to an embodiment, the electronic device 200 may include the processor 210. The processor 210 may be operatively (or operably) coupled with or connected with the memory 220, the display 230, and the sensor 240. That the processor 210 is operatively (or operably) coupled with or connected with the memory 220, the display 230, and the sensor 240 may mean that the processor 210 may control the memory 220, the display 230, and the sensor 240.

For example, the processor 210 may control the memory 220, the display 230, and the sensor 240. The memory 220, the display 230, and the sensor 240 are controlled by the processor 210. For example, the processor 210 may be configured with at least one processor. For example, the processor 210 may include the at least one processor. For example, the processor 210 may correspond to a processor 120 of FIG. 1.

According to an embodiment, the processor 210 may include a hardware component for processing data based on one or more instructions. The hardware component for processing data may include, for example, an arithmetic and logic unit (ALU), a field programmable gate array (FPGA), and/or a central processing unit (CPU).

According to an embodiment, the electronic device 200 may include the memory 220. For example, the memory 220 may correspond to memory 130 of FIG. 1. For example, the memory 220 may be a volatile memory unit or units. For example, the memory 220 may be a nonvolatile memory unit or units. For example, the memory 220 may be another type of computer-readable medium, such as a magnetic or optical disk. For example, the memory 220 may store data obtained based on an operation (e.g., an algorithm performing operation) performed by the processor 210.

For example, the memory 220 may be used to store one or more programs. The one or more programs may include instructions that, when executed by the processor 210 of the electronic device 200, cause the electronic device 200 to perform a defined operation.

For example, in the memory 220, one or more instructions indicating a calculation and/or an operation to be performed by the processor 210 on data may be stored. A set of one or more instructions may be referred to as firmware, operating system, process, routine, sub-routine and/or application. For example, the electronic device 200 and/or the processor 210 may perform at least one of the operations of the electronic device 200 described below when a set of a plurality of instructions distributed in a form of the operating system, firmware, driver, and/or application is executed. Hereinafter, that the application is installed on the electronic device 200 may mean that one or more instructions provided in the form of the application are stored in the memory 220 of the electronic device 200, and the one or more applications are stored in an executable format (e.g., a file having an extension designated by the operating system of the electronic device 200) by the processor 210 of the electronic device 200. In some embodiments, the memory 220 may correspond to at least one memory.

According to an embodiment, the electronic device 200 may include the display 230. For example, the display 230 may correspond to a display module 160 of FIG. 1.

For example, the display 230 of the electronic device 200 may output visualized information to a user. The display 230 may include a liquid crystal display (LCD), a plasma display panel (PDP), one or more light emitting diodes (LEDs), and/or one or more organic light emitting diodes (OLEDs). According to an embodiment, the display 230 may include a sensor (e.g., a touch sensor panel (TSP)) for detecting an external object (e.g., a user's finger) on the display 230. For example, based on the TSP, the electronic device 200 may detect an external object (e.g., a user's finger) that is in contact with the display 230 or floating on the display 230. In response to detecting the external object, the electronic device 200 may execute a function related to a specific visual object corresponding to a portion of the display 230 that is in contact with the external object, among visual objects (e.g., a plurality of icons for photographing) displayed in the display 230.

For example, the display 230 may include a first display 231 and a second display 232. The first display 231 may be deformable by an external force applied to the first display 231. For example, the first display 231 may be referred to as a flexible display. The second display 232 may be referred to as a cover display. A specific example of the first display 231 and the second display 232 disposed in the electronic device 200 will be described through FIGS. 3A and 3B.

According to an embodiment, the electronic device 200 may include the sensor 240. The sensor 240 of the electronic device 200 may generate electronic information that may be processed by the processor 210 and/or the memory 220 from non-electronic information related to the electronic device 200. The electronic information generated by the sensor 240 may be stored in the memory 220, may be processed by the processor 210, or may be transmitted to another electronic device different from the electronic device 200. The sensor 240 may be one or more.

For example, the sensor 240 may include a hall sensor 241 for identifying an angle between housings included in the electronic device 200. The hall sensor 241 may include one or more magnets and/or one or more magnetic sensors. At least one of the one or more magnets or the one or more magnetic sensors included in the hall sensor 241 may be disposed at different positions in the electronic device 200. A positional relationship of the one or more magnets and/or the one or more magnetic sensors in the electronic device 200 may be changed according to a state (or shape) of the electronic device 200. The electronic device 200 may measure a change in the positional relationship through the one or more magnetic sensors. The change in the positional relationship may cause a change in a magnetic field formed by the one or more magnets. The electronic device 200 may obtain a power signal representing a change in the magnetic field by using the hall sensor 241. For example, the electronic device 200 may distinguish between a posture or a state (e.g., a folding state or an unfolding state) using the power signal obtained from the hall sensor 241. For example, the electronic device 200 may receive data representing the state of the electronic device 200 from the hall sensor 241. For example, the hall sensor 241 may output data representing the shape of the first display 231. A shape of the first display 231 may be changed as it is folded or unfolded by a folding axis (e.g., a folding axis 337 to be described later in FIG. 3A). For example, the hall sensor 241 may output different data representing the shape of the first display 231.

For example, the hall sensor 241 may include an analog hall sensor and/or a digital hall sensor. For example, the analog hall sensor may operate in an 'on' state when an identified magnetic force value is greater than or equal to a threshold value. The analog hall sensor may operate in an 'off' state when the identified magnetic force value is less than the threshold value. For example, the digital hall sensor may measure a magnetic force value in addition to a function of the analog hall sensor. The threshold value of the analog hall sensor is fixed, but the threshold value of the digital hall sensor may be changed.

According to an embodiment, the sensor 240 may include an inertial sensor 242. The inertial sensor 242 may include at least one of an acceleration sensor and/or a gyro sensor. For example, the acceleration sensor may identify (or measure, detect) acceleration of the electronic device 200 in three directions of an x-axis, y-axis, and z-axis. For example, the gyro sensor may identify (or measure, detect) angular velocity of the electronic device 200 in three directions of the x-axis, y-axis, and z-axis.

For example, the inertial sensor 242 may include a first inertial sensor 242-1 and a second inertial sensor 242-2. The first inertial sensor 242-1 may be disposed in a first housing (e.g., a first housing 310 of FIG. 3A) of the electronic device 200. The second inertial sensor 242-2 may be disposed in a second housing (e.g., a second housing 320 of FIG. 3A) of the electronic device 200. The first inertial sensor 242-1 may be used to set a display mode (e.g., a landscape mode and a portrait mode) of the display (e.g., the first display 231 and the second display 232) of the electronic device 200. The second inertial sensor 242-2 may be used together with the first inertial sensor 242-1 to identify an angle between the first housing and the second housing of the electronic device 200.

For example, the inertial sensor 242 may be used to identify a posture of the electronic device 200. The processor 210 of the electronic device 200 may identify the posture (or orientation) of the electronic device 200 by using the inertial sensor 242.

Figure 3A:
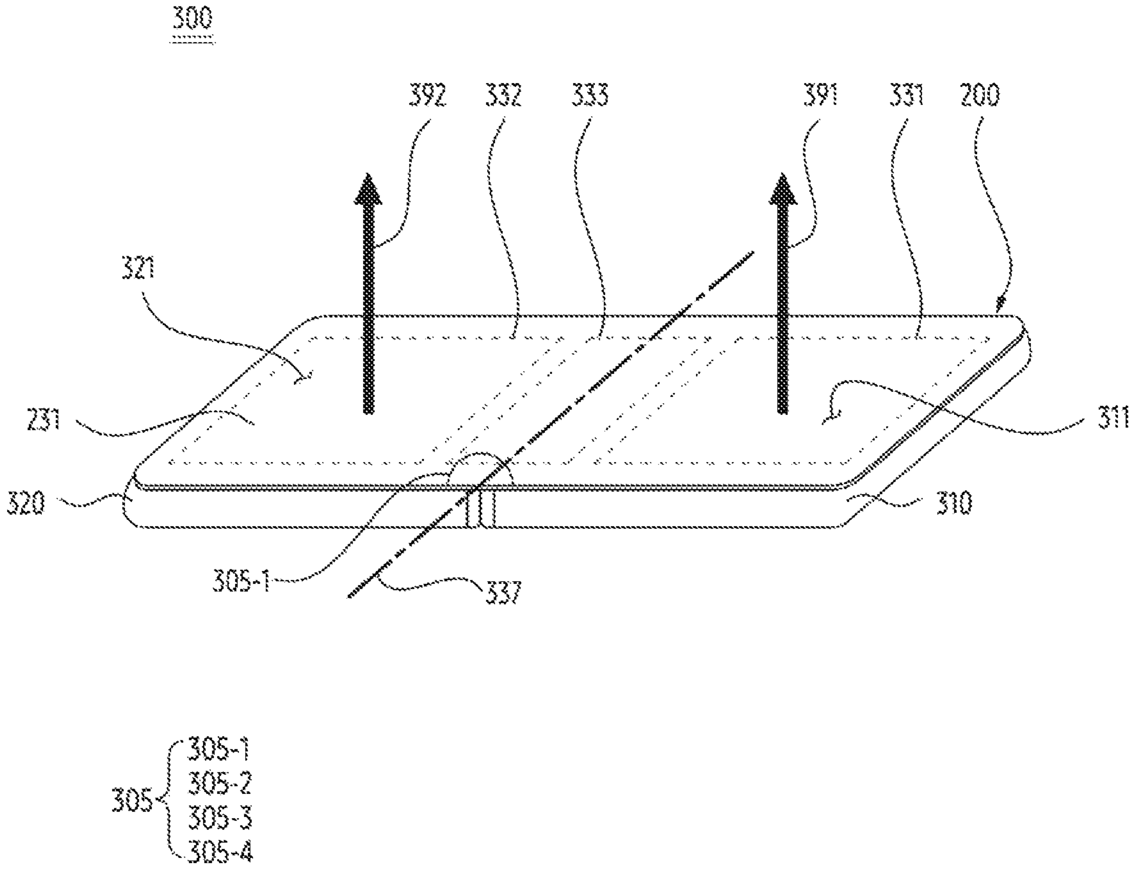
FIGS. 3A and 3B illustrate an example of a positional relationship between a first housing and a second housing in an unfolding state and a folding state of an electronic device according to an embodiment.
Figure 3B:
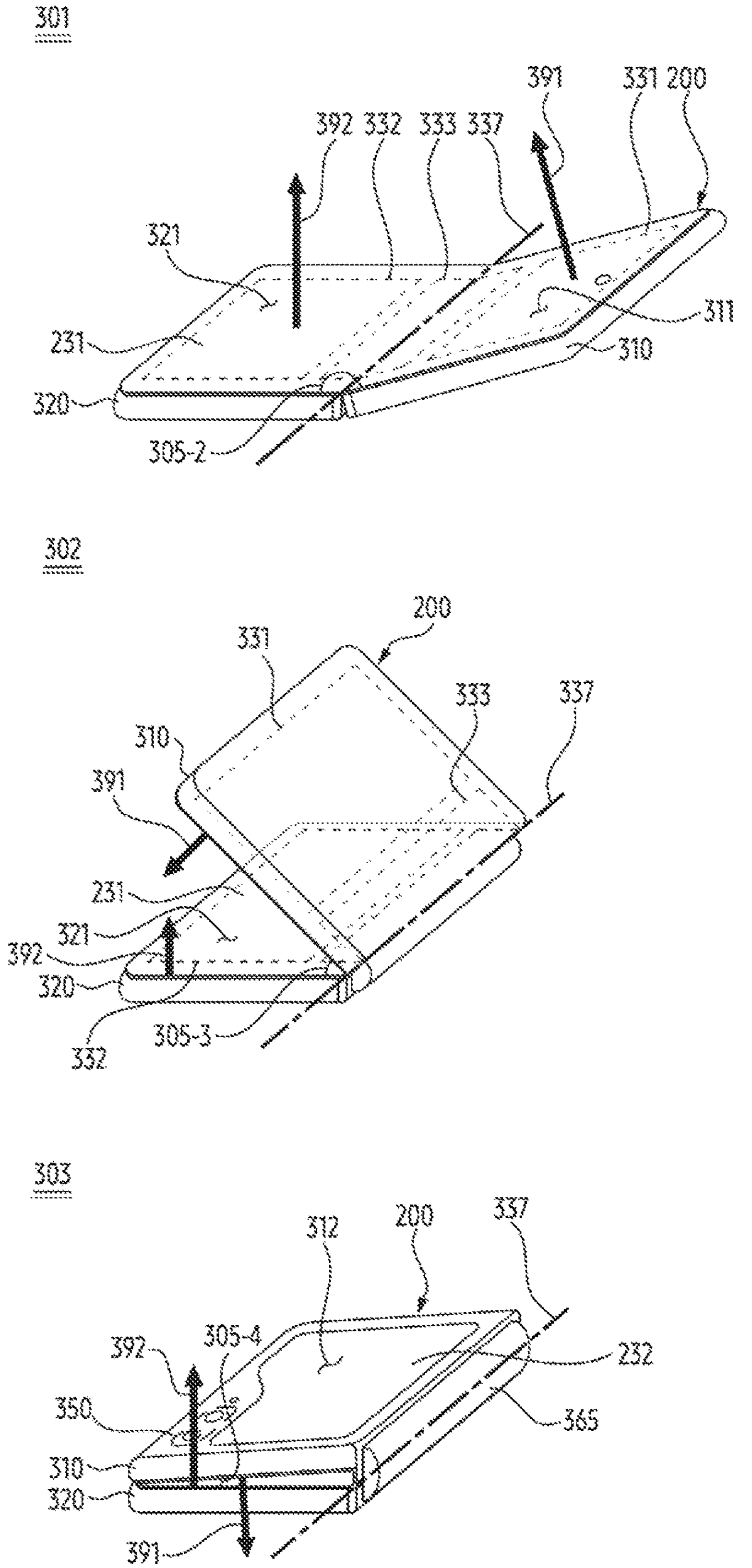

FIGS. 3A and 3B illustrate an example of a positional relationship between a first housing and a second housing in an unfolding state and a folding state of an electronic device according to an embodiment.

Referring to FIGS. 3A and 3B, an electronic device 200 may be an example of an electronic device 101 of FIG. 1. A first housing 310, a second housing 320, and a folding housing 365 may be included in the electronic device 200. The electronic device 200 may include the first housing 310 including a first surface 311 and a second surface 312 opposite to the first surface. In an embodiment, the electronic device 200 may include the second housing 320 including a third surface 321 and a fourth surface opposite to the third surface 321. The electronic device 200 may include the folding housing 365 that pivotably connects the first housing 310 and the second housing 320. At least a portion of a first display 231 may be disposed on one surface (e.g., the first surface 311) of the housing 310 and one surface (e.g., the third surface 321) of the second housing 320. For example, at least a portion of the first display 231 may be disposed on the first surface 311 and the third surface 321 across the folding housing 365. The first display 231 may have a first display area 331, a second display area 332, and a third display area 333. The folding housing 365 may include a hinge (or hinge structure). A second display 232 may be disposed on the second surface 312. The electronic device 200 may include a camera facing a direction in which the second surface 312 faces. The camera may be disposed in a partial area 350 of the second surface 312.

The housing (e.g., the first housing 310, the second housing 320, and the folding housing 365) described above may be referred to as a housing part. For example, the first housing 310 may be referred to as a first housing part. For example, the second housing 320 may be referred to as a second housing part. For example, the folding housing 365 may be referred to as a folding housing part.

According to an embodiment, the electronic device 200 may provide the unfolding state in which the first housing 310 and the second housing 320 are fully folded out by the folding housing 365. For example, referring to FIG. 3A, the electronic device 200 may be in the unfolding state 300. For example, a state 300 may mean a state in which a first direction 391 in which the first surface 311 faces corresponds to a second direction 392 in which the third surface 321 faces. For example, in the state 300, the first direction 391 may be substantially parallel to the second direction 392. For example, in the state 300, the first direction 391 may be substantially the same as the second direction 392.

According to an embodiment, the first surface 311 may form a substantially single plane with the third surface 321 in the state 300. For example, an angle 305-1 between the first surface 311 and the third surface 321 in the state 300 may be about 180 degrees. For example, the state 300 may mean a state in which all of an entire display area of the first display 231 may be substantially provided on a single plane. For example, the state 300 may mean a state in which all of the first display area 331, the second display area 332, and the third display area 333 may be provided on one plane. For example, in the state 300, the third display area 333 may not include a curved surface. For example, the unfolding state may be referred to as an outspread state or an outspreading state. Hereinafter, different states of the electronic device 200 based on angles 305-2, 305-3, and 305-4 will be described later.

Referring to FIG. 3B, the electronic device 200 according to an embodiment may provide the folding state in which the first housing 310 and the second housing 320 are folded in by the folding housing 365. For example, the electronic device 200 may be in the folding state including a state 301, a state 302, and a state 303. For example, the folding state including the state 301, the state 302, and the state 303 may mean a state in which the first direction 391 in which the first surface 311 faces is different from the second direction 392 in which the third surface 321 faces. For example, in the state 301, an angle between the first direction 391 and the second direction 392 is about 45 degrees, and the first direction 391 and the second direction 392 may be different from each other. For example, in the state 302, the angle between the first direction 391 and the second direction 392 is about 150 degrees, and the first direction 391 and the second direction 392 may be different from each other. For example, in the state 303, the angle between the first direction 391 and the second direction 392 is substantially 180 degrees, and the first direction 391 and the second direction 392 may be different from each other.

According to an embodiment, an angle between the first surface 311 and the third surface 321 in the folding state may be about 0 degrees or more and less than about 180 degrees. For example, in the state 301, an angle 305-2 between the first surface 311 and the third surface 321 may be about 135 degrees. In the state 302, an angle 305-3 between the first surface 311 and the third surface 321 may be about 30 degrees. In the state 303, the angle 305-4 between the first surface 311 and the third surface 321 may be substantially 0°. For example, the folding state may be referred to as a folded state.

In an embodiment, the folding state may include a plurality of sub-folding states, unlike the unfolding state. For example, referring to FIG. 3B, the folding state may include a plurality of sub-folding states, including the state 303 in which the first surface 311 is substantially overlapped on the third surface 321 by rotation provided through the folding housing 365, and the state 301 and the state 302, which are intermediate folding states between the state 303 and the unfolding state (e.g., the state 300 of FIG. 3A). For example, the electronic device 200 may provide the state 303 in which the entire area of the first display area 331 is substantially fully overlapped on the entire area of the second display area 332 as the first surface 311 and the third surface 321 face each other by the folding housing 365. For example, the electronic device 200 may provide the state 303 in which the first direction 391 is substantially opposite to the second direction 392. For example, the state 303 may mean a state in which the first display 231 is covered within the user's field of view looking at the electronic device 200. However, the disclosure is not limited thereto.

According to an embodiment, the first display 231 may be bent by rotation provided through the folding housing 365. For example, in the first display 231, unlike the first display area 331 and the second display area 332, the third display area 333 may be bent according to a folding operation. For example, the third display area 333 may be in a curved state in order to prevent damage to the first display 231 in the fully folding state. In the fully folding state, unlike the third display area 333 being curved, the entire first display area 331 may be fully overlapped on the entire second display area 332.

Referring to FIGS. 3A to 3B, an example in which the first display 231 of the electronic device 200 includes one folding display area (e.g., the third display area 333) or the electronic device 200 includes one folding housing (e.g., the folding housing 365) is illustrated, but this is for convenience of explanation. According to an embodiment, the first display 231 of the electronic device 200 may include a plurality of folding display areas. For example, the first display 231 of the electronic device 200 may include two or more folding display areas, and the electronic device 200 may include two or more folding housings for providing the two or more folding areas, respectively.

Figure 4:
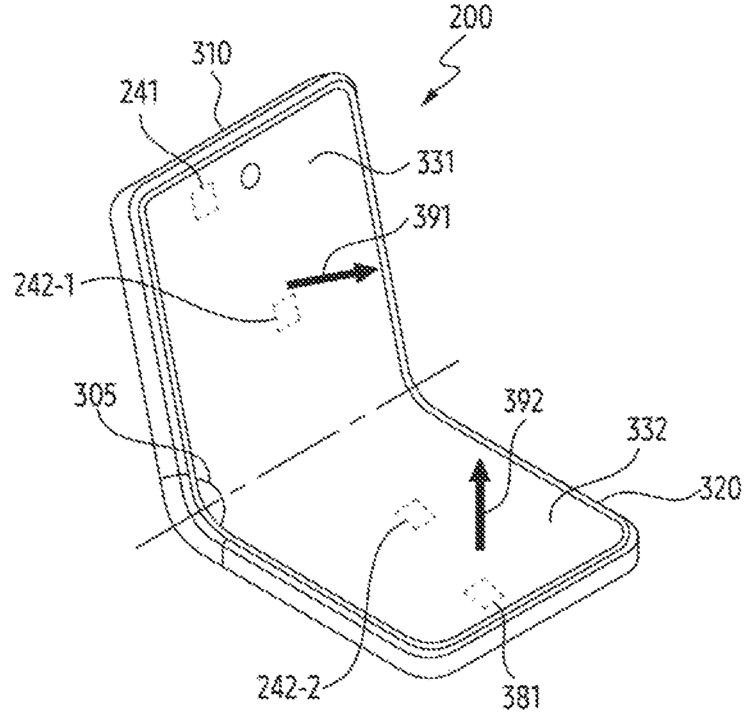
FIG. 4 illustrates an example of a plurality of states of an electronic device according to an embodiment.

FIG. 4 illustrates an example of a plurality of states of an electronic device according to an embodiment.

Referring to FIG. 4, an electronic device 200 may provide a plurality of states based on a positional relationship between a first housing 310 and a second housing 320. For example, the electronic device 200 may provide the plurality of states based on an angle 305 between a first display area 331 and a second display area 332. For example, the electronic device 200 may provide the plurality of states based on an angle between a first direction 391 in which the first display area 331 faces and a second direction 392 in which the second display area 332 faces.

According to an embodiment, the electronic device 200 may identify the angle 305 between the first display area 331 and the second display area 332. For example, the electronic device 200 may include a first inertial sensor 242-1 disposed in the first housing 310 and a second inertial sensor 242-2 disposed in the second housing 320. The processor 210 may identify the angle 305 based on a first vector representing a direction of gravity identified through the first inertial sensor 242-1 and a second vector representing a direction of gravity identified through the second inertial sensor 242-2.

According to an embodiment, the electronic device 200 may include a hall sensor 241. The electronic device 200 may include at least one magnet 381. The hall sensor 241 included in the electronic device 200 may obtain data on a magnetic field generated by the at least one magnet 381. The processor 210 may identify whether a state of the electronic device 200 is a first state (e.g., a folding state) among the plurality of states based on the data on the magnetic field obtained using the hall sensor 241. According to an embodiment, the processor 210 may identify the angle 305 by using the hall sensor 241.

According to an embodiment, the hall sensor 241 may be disposed in the first housing 310. The magnet 381 may be disposed in the second housing 320. For example, the magnet 381 may be disposed at a position corresponding to a position of the hall sensor 241, in the second housing 320.

FIG. 4 illustrates an example in which the hall sensor 241, the magnet 381, the first inertial sensor 242-1, and the second inertial sensor 242-2 are disposed in the electronic device 200, but is not limited thereto. The hall sensor 241, the magnet 381, the first inertial sensor 242-1, and the second inertial sensor 242-2 may be variously disposed in order to identify the angle 305 between the first display area 331 and the second display area 332.

According to an embodiment, the electronic device 200 may provide the plurality of states based on the positional relationship between the first housing 310 and the second housing 320. For example, the electronic device 200 may provide the plurality of states based on the angle 305 between the first display area 331 and the second display area 332. For example, the electronic device 200 may provide the plurality of states based on the angle between the first direction 391 in which the first display area 331 faces and the second direction 392 in which the second display area 332 faces.

For example, the electronic device 200 may provide a first state corresponding to a first angle between the first direction 391 in which the first display area 331 faces and the second direction 392 in which the second display area 332 faces, which is greater than or equal to a first predetermined angle (e.g., about 178 degrees). For example, the electronic device 200 may identify the state of the electronic device 200 as the first state based on that the first direction 391 and the second direction 392 are opposite to each other. For example, the electronic device 200 may identify the state of the electronic device 200 as the first state, based on that the first angle between the first direction 391 and the second direction 392 is about 180 degrees, which is greater than or equal to the first predetermined angle (e.g., about 178 degrees). For example, the electronic device 200 may provide the first state in which the angle between the first housing 310 and the second housing 320 is less than or equal to "180 degrees−the first predetermined angle" (or a fourth predetermined angle). For example, the first state may be referred to as a folding state. For example, the first state may be referred to as 'flex state 0'. For example, while the state of the electronic device 200 is in the first state, the second display 232 may be activated.

For example, the electronic device 200 may provide a second state corresponding to a second angle between the first direction 391 (in which the first display area 331 faces) and the second direction 392 (in which the second display area 332 faces), which is greater than or equal to a second predetermined angle (e.g., about 100 degrees) and less than the first predetermined angle (e.g., about 178 degrees). For example, the electronic device 200 may provide the second state in which the angle between the first housing 310 and the second housing 320 exceeds "180 degrees−the first predetermined angle" (or the fourth predetermined angle) and is less than or equal to "180 degrees−the second predetermined angle" (or a fifth predetermined angle). For example, the second state may be referred to as a sub-folding state. For example, the second state may be referred to as 'flex state 1'. For example, while the state of the electronic device 200 is in the second state, the second display 232 may be activated.

For example, the electronic device 200 may provide a third state corresponding to a third angle between the first direction 391 (in which the first display area 331 faces) and the second direction 392 (in which the second display area 332 faces), which is greater than or equal to a third predetermined angle (e.g., about 20 degrees) and less than the second predetermined angle (e.g., about 100 degrees). For example, the electronic device 200 may provide the third state in which the angle between the first housing 310 and the second housing 320 exceeds "180 degrees−the second predetermined angle" (or the fifth predetermined angle) and is less than or equal to "180 degrees−the third predetermined angle" (or a sixth predetermined angle). For example, the third state may be referred to as the sub-folding state. For example, the third state may be referred to as 'flex state 2'. For example, while the state of the electronic device 200 is in the third state, the first display 231 may be activated.

For example, the electronic device 200 may provide a fourth state corresponding to a fourth angle between the first direction 391 (in which the first display area 331 faces) and the second direction 392 (in which the second display area 332 faces), which is less than the third predetermined angle (e.g., about 20 degrees). For example, the electronic device 200 may provide the fourth state in which the angle between the first housing 310 and the second housing 320 exceeds "180 degrees−the third predetermined angle" (or the sixth predetermined angle).

For example, the fourth state may be referred to as the unfolding state. For example, the fourth state may be referred to as 'flex state 3'. For example, while the state of the electronic device 200 is in the fourth state, the first display 231 may be activated.

According to an embodiment, the above-described first to third angles may be changed. For example, the first to third angles may be changed based on a user experience (UX) concept and/or a request of a client (or client program). In the above-described embodiment, one of the plurality of states is identified based on the angle between the first direction 391 (in which the first display area 331 faces) and the second direction 392 (in which the second display area 332 faces), but is not limited thereto.

According to an embodiment, in the first state, the first display 231 may be in a folded state. In the first state, the first display 231 may not be used. The first state may be a state in which a length of the electronic device 200 is shortened to protect the first display 231 and to facilitate portability. The processor 210 may auxiliary use the second display 232 in the first state. The processor 210 may provide summarized content through the second display 232 in the first state. The processor 210 may provide full content based on the state of the electronic device 200 changing from the first state to one of the third and/or fourth states in which the first display 231 is activated.

According to an embodiment, in the fourth state, the electronic device 200 may provide the first display area 331 and the second display area 332 on one plane, by using the first display 231.

According to an embodiment, in the second state and the third state, the electronic device 200 may provide a physically divided screen. For example, the electronic device 200 may provide a screen in which the first display area 331 and the second display area 332 are physically divided as the first display 231 is folded. The processor 210 may provide a service (e.g., an application service or a split screen service) for the physically divided screen. For example, the processor 210 may set the first display area 331 as an output unit. The processor 210 may provide an image or content through the first display area 331. The processor 210 may set the second display area 332 as an input unit. The processor 210 may provide an interface (e.g., keyboard) for input through the second display area 332. According to an embodiment, the electronic device 200 may set the first display area 331 as the output unit and may set the second display area 332 as the input unit, in a state in which the second housing 320 is placed on a surface corresponding to the ground. The electronic device 200 may set the first display area 331 as the input unit and may set the second display area 332 as the output unit, in a state in which the first housing 310 is placed on the surface corresponding to the ground.

According to an embodiment, the electronic device 200 may operate in the state in which one surface of the housing (e.g., the first housing 310 or the second housing 320) is placed on the surface corresponding to the ground. For example, in case that the electronic device 200 operates in the state in which the one surface of the housing (e.g., the first housing 310 or the second housing 320) is placed on the surface corresponding to the ground, the electronic device 200 may operate in a tabletop mode. For example, while the electronic device 200 operates in the tabletop mode, the user may use one of the first display area 331 and the second display area 332 of the first display 231 stand, by making it stand. The user may adjust the angle 305 between the first housing 310 and the second housing 320. For example, while the electronic device 200 operates in the tabletop mode, the processor 210 may display the content in a display area in a direction facing the user among the first display area 331 and the second display area 332 of the first display

231. According to an embodiment, a camera may be disposed in the first display area 331. The processor 210 may provide a service using the camera, in a state in which the user does not grip the electronic device 200. For example, the processor 210 may provide a service for a video call or personal broadcasting, in the state in which the user does not grip the electronic device 200.

According to an embodiment, the processor 210 may provide various modes according to a posture of the electronic device 200 in addition to the above-described tabletop mode.

Figure 5:
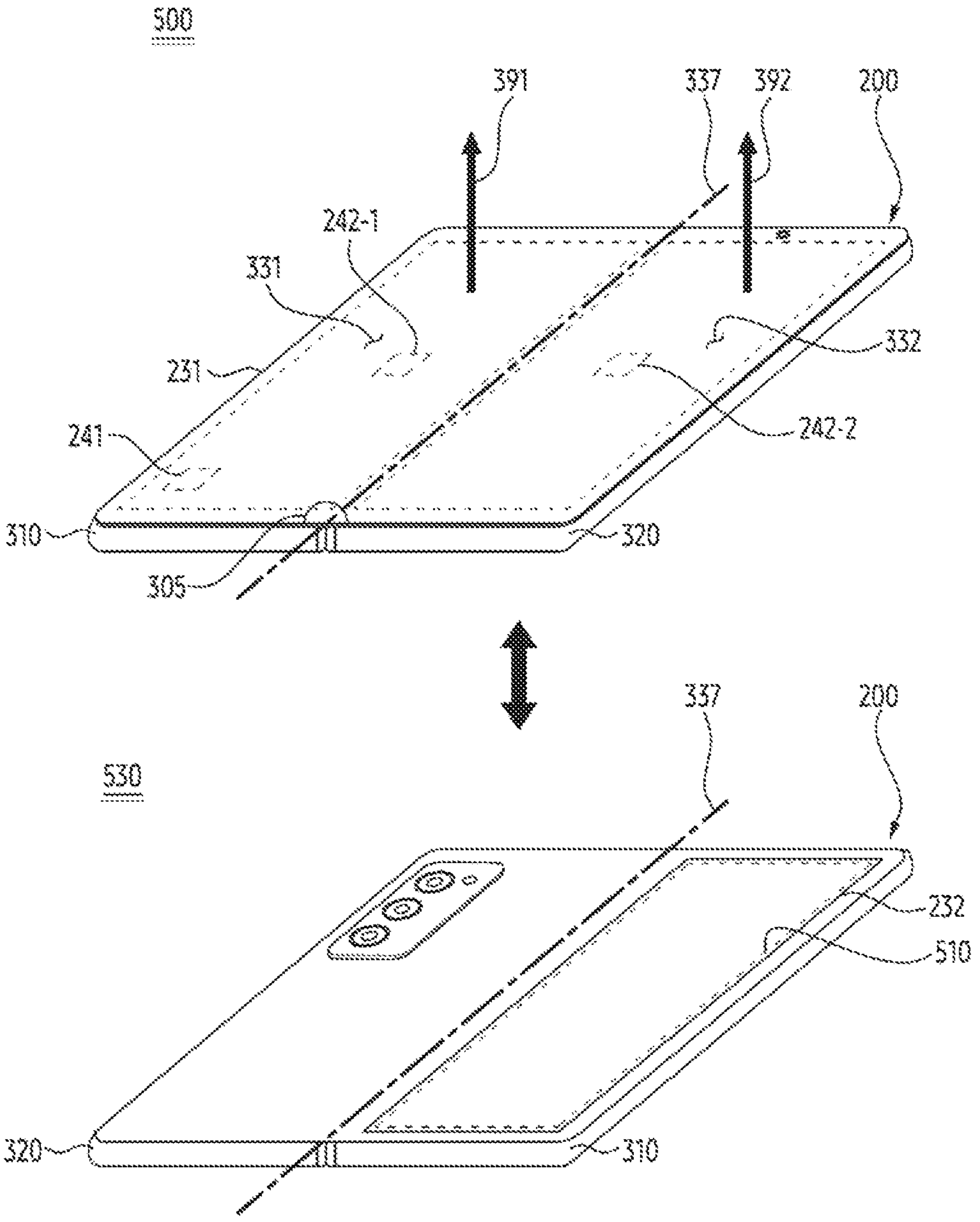
FIG. 5 illustrates examples of a top view and a bottom view of an electronic device in an unfolding state of the electronic device according to an embodiment.

In FIGS. 3A, 3B, and 4 described above, the electronic device 200 in which the first display 231 is folded along the first direction (e.g., a horizontal direction) is illustrated, but the disclosure is not limited thereto. FIG. 5 illustrates the electronic device 200 in which the first display 231 is folded along the second direction (e.g., a vertical direction) perpendicular to the first direction.

FIG. 5 illustrates examples of a top view and a bottom view of an electronic device in an unfolding state of the electronic device according to an embodiment.

Referring to FIG. 5, a state 500 represents a top view of an electronic device 200 in the unfolding state. A state 530 represents a bottom view of the electronic device 200 in the unfolding state.

The electronic device 200 may include a first housing 310 and a second housing 320. The electronic device 200 may be folded such that the first housing 310 and the second housing 320 stack or overlap each other. The electronic device 200 may include a hinge for configuring the first housing 310 and the second housing 320 to be folded along a folding axis 337. For example, the folding axis 337 may mean a reference for folding the electronic device 200.

According to an embodiment, a first display 231 of the electronic device 200 may be configured as a flexible display. The first display 231 of the electronic device 200 may be folded along the folding axis 337. For example, the first display 231 may include a first display area 331 and a second display area 332. The second display area 332 may be adjacent to the first display area 331 along the folding axis 337. For example, a display area of the first display 231 may be divided into the first display area 331 and the second display area 332 along the folding axis 337.

Referring to the state 530, the electronic device 200 may include a second display 232 for providing a third display area 510 facing the first display area 331 of the first housing 310.

According to an embodiment, the electronic device 200 may include a hall sensor 241 including a magnet 381, a first inertial sensor 242-1, and a second inertial sensor 242-2. For example, the hall sensor 241 may be disposed in the first housing 310. The first inertial sensor 242-1 may be disposed in the first housing 310. The second inertial sensor 242-2 may be disposed in the second housing 320. Positions in which the hall sensor 241, the first inertial sensor 242-1, and the second inertial sensor 242-2 are disposed are exemplary and are not limited thereto. According to an embodiment, the positions of each of the hall sensor 241, the first inertial sensor 242-1, and the second inertial sensor 242-2 may be changed.

The electronic device 200 illustrated in FIGS. 3A and 3B and the electronic device 200 illustrated in FIG. 5 may have different folding directions. In addition, in the electronic device 200 illustrated in FIGS. 3A and 3B, an external camera may be disposed within the first housing 310. In the electronic device 200 illustrated in FIG. 5, the external camera may be disposed within the second housing 320.

According to an embodiment, the electronic device 200 may provide a plurality of states according to an angle between the first housing 310 and the second housing 320. The plurality of states may correspond to a plurality of states described in FIG. 4. According to an embodiment, in a second state and a third state among the plurality of states described in FIG. 4, the electronic device 200 may operate in a flex mode.

For example, the second state may correspond to a second angle between a first direction 391 in which the first display area 331 faces and a second direction 392 in which the second display area 332 faces, which is greater than or equal to a second predetermined angle (e.g., about 100 degrees) and less than a first predetermined angle (e.g., about 178 degrees). For example, the third state may correspond to a third angle between the first direction 391 (in which the first display area 331 faces) and the second direction 392 (in which the second display area 332 faces), which is greater than or equal to a third predetermined angle (e.g., about 20 degrees) and less than the second predetermined angle (e.g., about 100 degrees).

For example, the flex mode may be a mode for the electronic device 200 to operate in the second state and the third state. For example, in the flex mode, the processor 210 may provide a screen in which the first display area 331 and the second display area 332 are divided.

According to an embodiment, the electronic device 200 may be configured based on one of a form factor illustrated in FIGS. 3A, 3B, and 4 and a form factor illustrated in FIG. 5. Hereinafter, a following embodiment may be described based on the electronic device 200 configured based on the form factor illustrated in FIGS. 3A, 3B, and 4. However, the disclosure is not limited thereto. For example, the electronic device 200 described below may be configured based on the form factor illustrated in FIG. 5.

Figure 6:
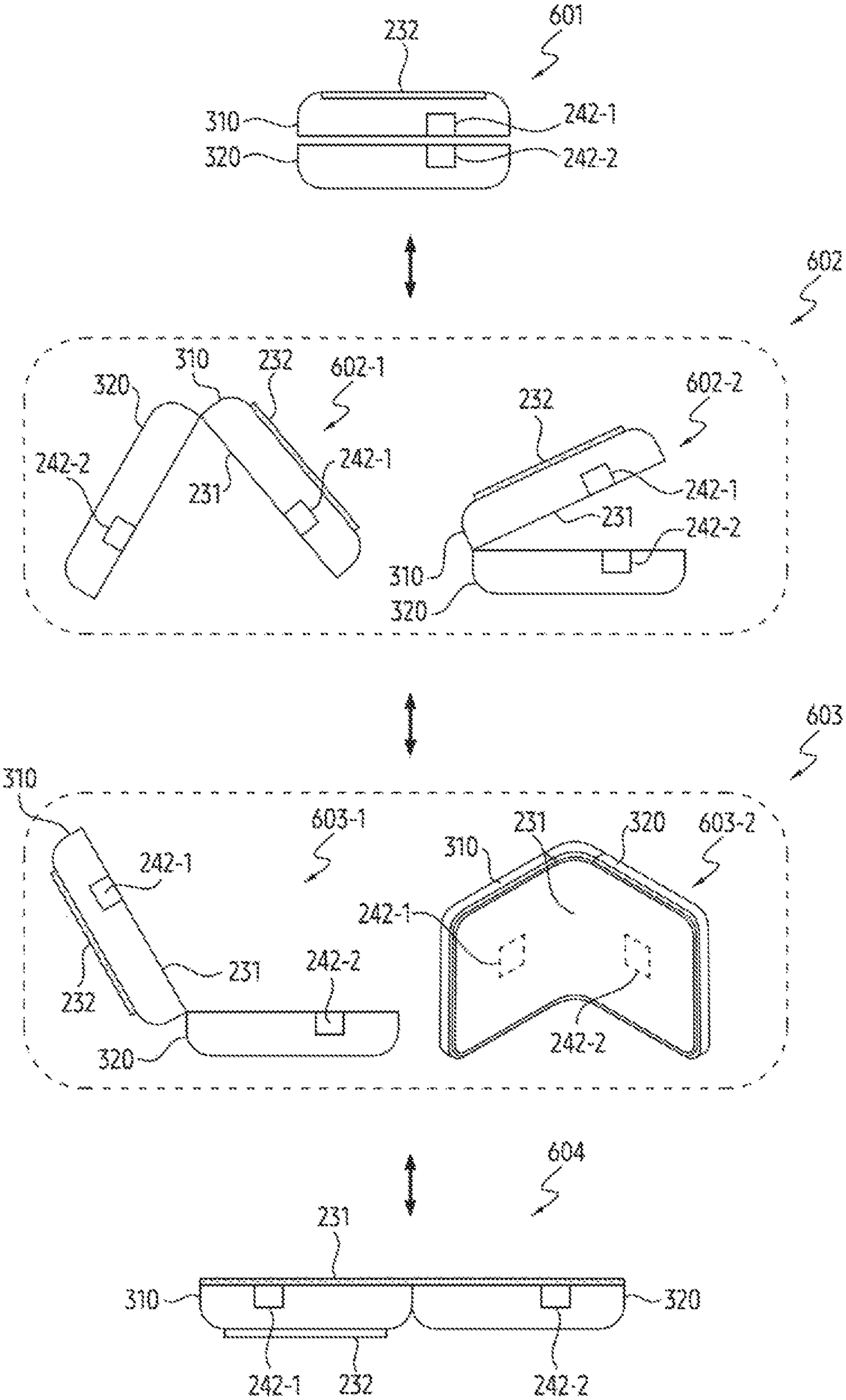
FIG. 6 illustrates an example of a plurality of states of an electronic device according to an embodiment.

FIG. 6 illustrates an example of a plurality of states of an electronic device according to an embodiment.

An electronic device 200 illustrated in FIG. 6 may correspond to the electronic device 200 illustrated in FIGS. 3A, 3B, and 4. Hereinafter, for convenience of description, a plurality of states of the electronic device 200 will be described based on the electronic device 200 illustrated in FIGS. 3A, 3B, and 4.

Referring to FIG. 6, the electronic device 200 may provide one of a plurality of states based on an angle 305 between a first housing 310 and a second housing 320.

For example, the electronic device 200 may provide one of first to fourth states based on the angle 305 between the first housing 310 and the second housing 320. For example, a processor 210 may identify the angle 305 (or an angle between a direction 391 in which a first display area 331 faces and a direction 392 in which a second display area 332 faces) between the first housing 310 and the second housing 320 by using at least some of a hall sensor 241, a first inertial sensor 242-1, and a second inertial sensor 242-2. The processor 210 may identify a state of the electronic device 200 as one of the plurality of states based on the angle 305.

In a first state 601, the angle between the direction 391 in which the first display area 331 faces and the direction 392 in which the second display area 332 faces of the first display 231 may be greater than or equal to a first angle (e.g., about 178 degrees). For example, an angle between the first housing 310 and the second housing 320 may be less than or equal to a fourth angle (e.g., about 2 degrees). For example, the first state 601 may be referred to as a folding state. In the first state 601, since the first display 231 is in a folded state, a second display 232 may be activated.

In the second state 602, the angle between the direction 391 in which the first display area 331 faces and the direction 392 in which the second display area 332 faces of the first display 231 may be greater than or equal to a second angle (e.g., about 100 degrees) and less than the first angle (e.g., about 178 degrees). For example, the angle between the first housing 310 and the second housing 320 may be greater than the fourth angle (e.g., 2 degrees) and less than or equal to the fifth angle (e.g., about 80 degrees). For example, the second state 602 may be referred to as a sub-folding state. In the second state 602, the second display 232 may be activated.

For example, in the second state 602, the electronic device 200 may operate in one of a first mode 602-1 and a second mode 602-2. The processor 210 may identify a posture of the electronic device 200 based on an inertial sensor 242. The processor 210 may set a mode of the electronic device 200 to one of the first mode 602-1 and the second mode 602-2, based on the posture of the electronic device 200.

For example, while the posture of the electronic device 200 is a posture in which the first display 231 (or the first display area 331 and the second display area 332) faces the ground, the processor 210 may set the mode of the electronic device 200 to a first mode 602-1. For example, while the electronic device 200 operates in the first mode 602-1, the second display 232 may be activated. While the electronic device 200 operates in the first mode 602-1, a first screen may be displayed. For example, the first screen may mean a screen displayed based on a display mode (or display direction) according to the first mode 602-1. The first mode 602-1 may be referred to as a 'flex tent' mode.

For example, while the posture of the electronic device 200 is a posture in which one surface of the second housing 320 is placed on a surface corresponding to the ground, the processor 210 may set the mode of the electronic device 200 to a second mode 602-2. For example, while the electronic device 200 operates in the second mode 602-2, the second display 232 may be activated. While the electronic device 200 operates in the second mode 602-2, a second screen may be displayed. For example, the second screen may mean a screen displayed based on a display mode (or display direction) according to the second mode 602-2. For example, the second screen may be a screen in which the first screen displayed in the second mode 602-2 is rotated by 180 degrees. The second mode 602-2 may be referred to as a flex cover mode.

In a third state 603, the angle between the direction 391 in which the first display area 331 faces and the direction 392 in which the second display area 332 faces of the first display 231 may be greater than or equal to a third angle (e.g., about 20 degrees) and less than the second angle (e.g., about 100 degrees). For example, the angle between the first housing 310 and the second housing 320 may be greater than the fifth angle (e.g., about 80 degrees) and less than or equal to a sixth angle (e.g., about 160 degrees). For example, the third state 603 may be referred to as the sub-folding state. In the third state 603, the first display 231 may be activated.

For example, in the third state 603, the electronic device 200 may operate in one of a third mode 603-1 and a fourth mode 603-2. The processor 210 may identify the posture of the electronic device 200 based on the inertial sensor 242. The processor 210 may set the mode of the electronic device 200 to one of the third mode 603-1 and the fourth mode 603-2, based on the posture of the electronic device 200.

For example, while the posture of the electronic device 200 is the posture in which one surface of the second housing 320 is placed on the surface corresponding to the ground, the processor 210 may set the mode of the electronic device 200 to the third mode 603-1. For example, while the electronic device 200 operates in the third mode 603-1, the first display 231 may be activated. While the electronic device 200 operates in the third mode 603-1, a third screen may be displayed through the first display 231. The third screen may be configured based on a landscape mode.

For example, while the posture of the electronic device 200 is a posture in which the direction 391 in which the first display area 331 faces and the direction 392 in which the second display area 332 faces are substantially parallel to the ground, the processor 210 may set the mode of the electronic device 200 to the fourth mode 603-2. For example, while the electronic device 200 operates in the fourth mode 603-2, the first display 231 may be activated. While the electronic device 200 operates in the fourth mode 603-2, a fourth screen may be displayed through the first display 231. The fourth screen may be configured based on the landscape mode.

In a fourth state 604, the angle between the direction 391 in which the first display area 331 faces and the direction 392 in which the second display area 332 faces of the first display 231 may be less than the third angle. For example, the angle between the first housing 310 and the second housing 320 may exceed the sixth angle. For example, the fourth state 604 may be referred to as an unfolding state. In the fourth state 604, the first display 231 may be activated.

Figure 7A:
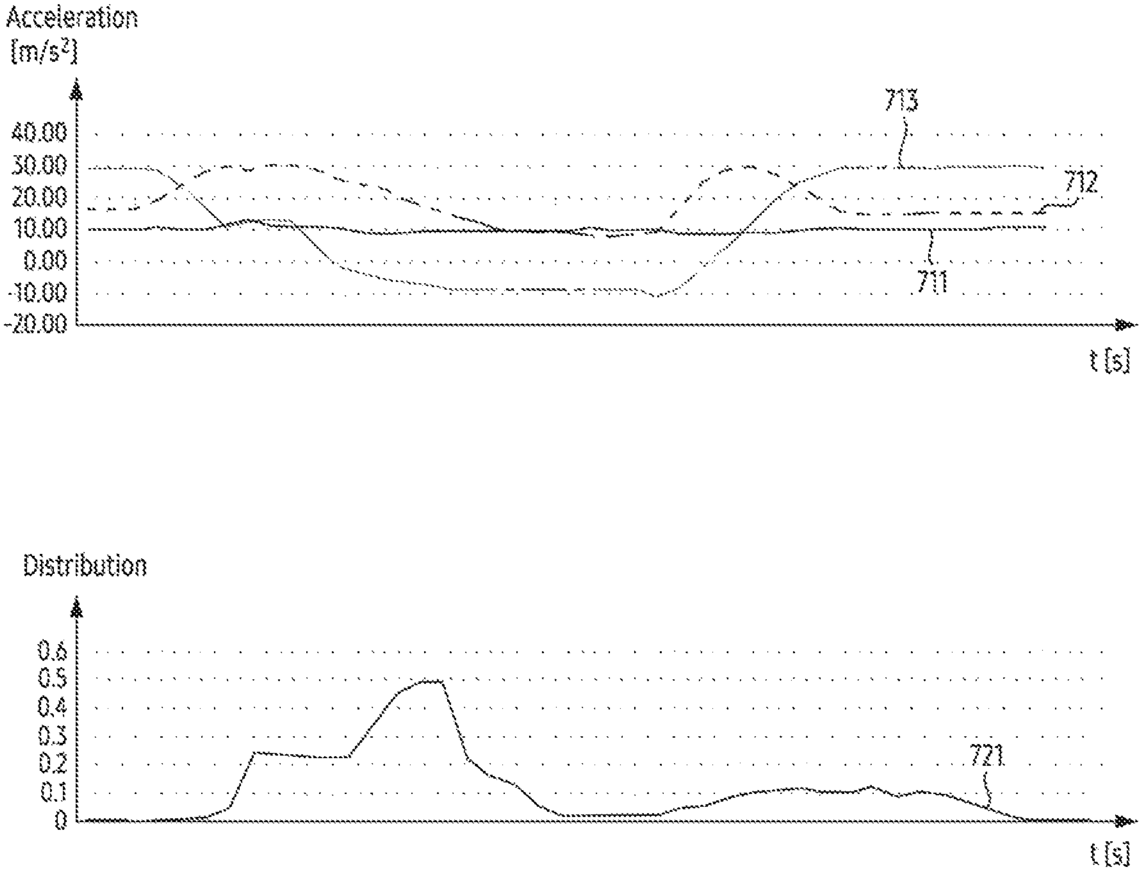
FIGS. 7A and 7B illustrate examples of graphs related to parameters for identifying a state of an electronic device.
Figure 7B:
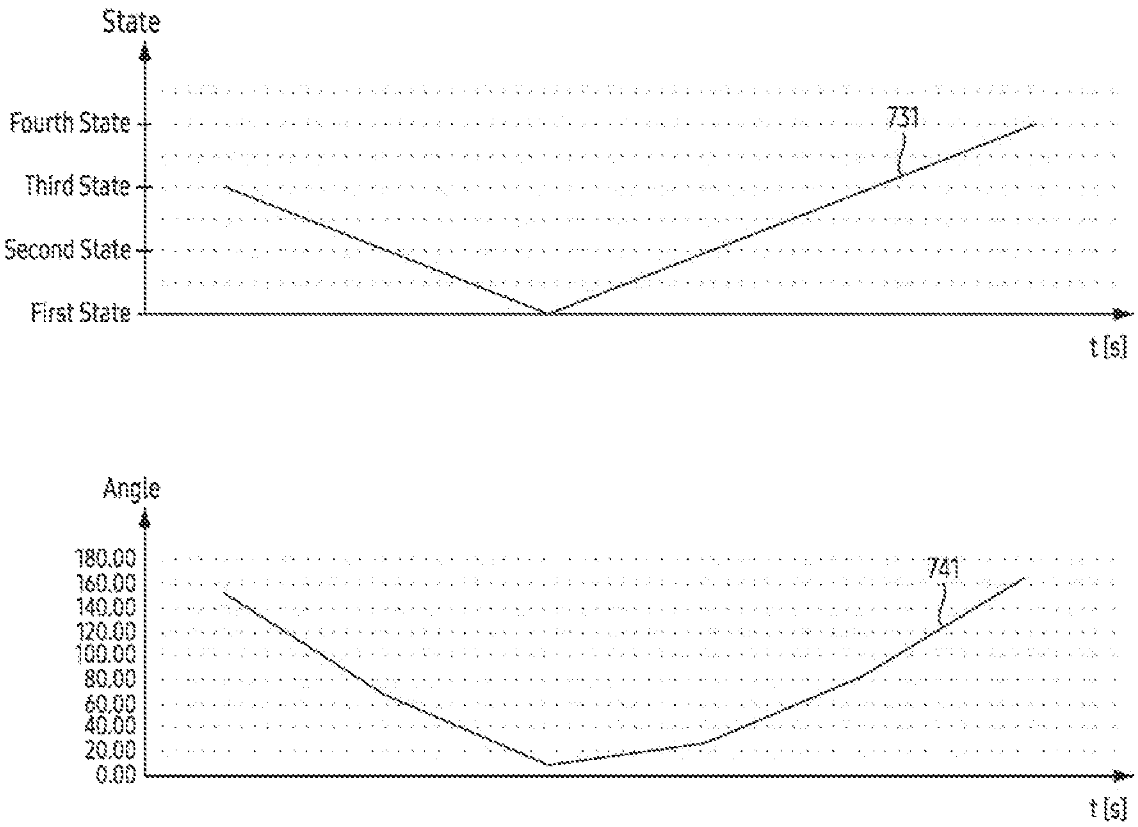

FIGS. 7A and 7B illustrate examples of graphs related to parameters for identifying a state of an electronic device.

Figure 7C:
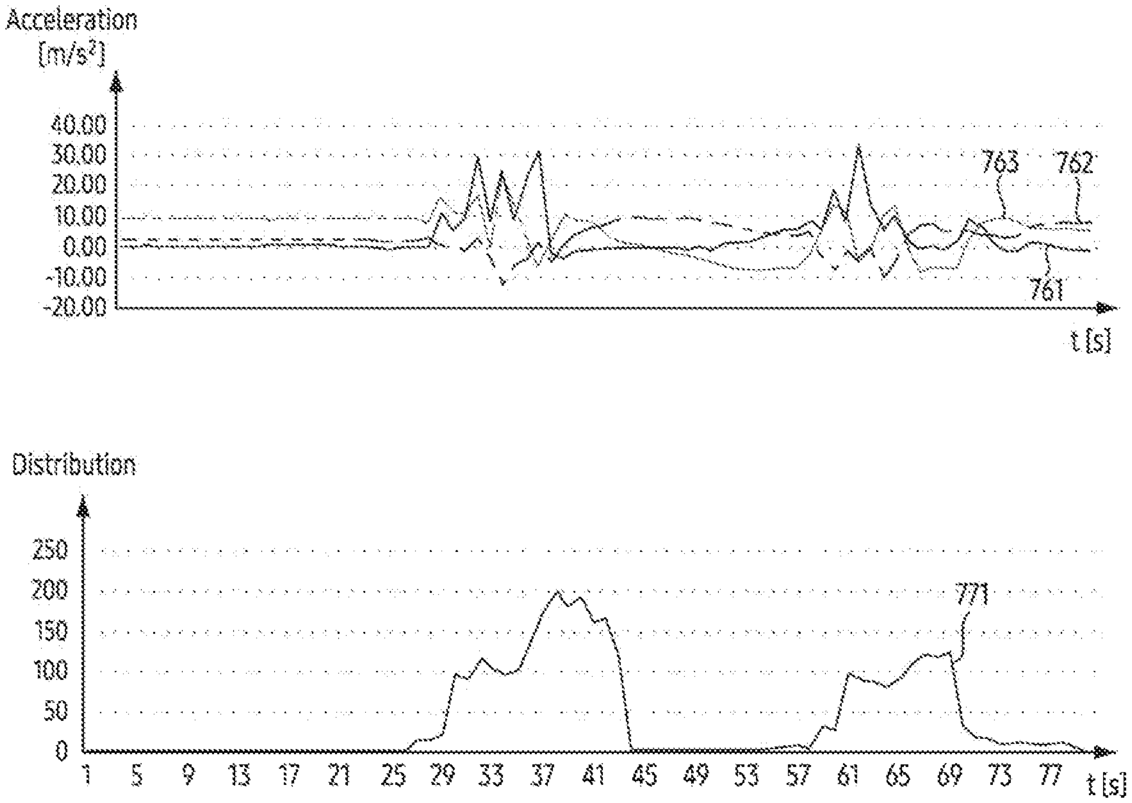
FIGS. 7C and 7D illustrate examples of graphs related to parameters for identifying a state of an electronic device.
Figure 7D:
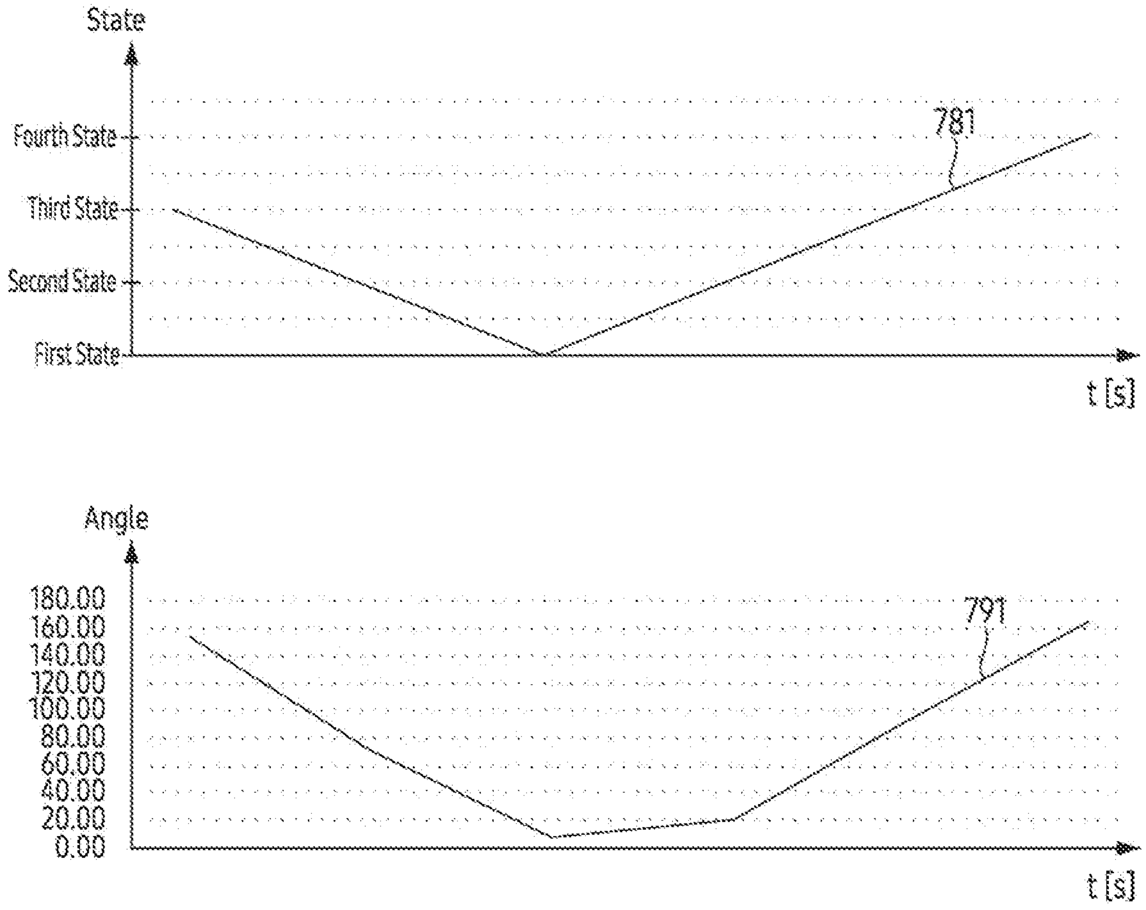

FIGS. 7C and 7D illustrate examples of graphs related to parameters for identifying a state of an electronic device.

FIGS. 7A and 7B illustrate graphs obtained in case that only a movement due to a state change of an electronic device 200 occurs. FIGS. 7C and 7D illustrate graphs obtained in case that the movement due to the state change of the electronic device 200 and a movement by an external force occur together.

Referring to FIGS. 7A and 7B, the electronic device 200 may identify a change in acceleration over time of the electronic device 200 using an inertial sensor 242 (e.g., a first inertial sensor 242-1 or a second inertial sensor 242-2). For example, a graph 711 represents a change in acceleration over time with respect to an x-axis. A graph 712 represents a change in acceleration over time with respect to a y-axis. A graph 713 represents a change in acceleration over time with respect to a z-axis. A processor 210 may identify a graph 721 based on the graph 711, the graph 712, and the graph 713. The graph 721 represents a variance value for acceleration over time. Based on identifying that the variance value for acceleration over time is less than or equal to a designated value (e.g., 1), the processor 210 may identify that no movement due to the external force has occurred in the electronic device 200.

While no movement due to the external force occurs in the electronic device 200, the processor 210 may identify an angle between a first housing 310 and a second housing 320. A graph 741 represents the angle between the first housing 310 and the second housing 320 over time.

The processor 210 may identify a state of the electronic device 200 based on the angle between the first housing 310 and the second housing 320. A graph 731 represents the state of the electronic device 200 over time.

Referring to the graph 731, the electronic device 200 may identify the state of the electronic device 200 over time. According to the graph 731, the processor 210 may identify the state of the electronic device 200 by using the inertial sensor 242 in a state in which no movement due to the external force occurs.

Referring to FIGS. 7C and 7D, the electronic device 200 may identify the change in acceleration over time of the electronic device 200 using the inertial sensor 242 (e.g., the first inertial sensor 242-1 or the second inertial sensor 242-2). For example, a graph 761 represents the change in acceleration over time with respect to the x-axis. A graph 762 represents the change in acceleration over time with respect to the y-axis. A graph 763 represents the change in acceleration over time with respect to the z-axis. The processor 210 may identify a graph 771 based on the graph 761, the graph 762, and the graph 763. The graph 771 represents the variance value for acceleration over time. Based on identifying that the variance value for acceleration over time exceeds the designated value (e.g., 1), the processor 210 may identify that the movement due to the external force has occurred in the electronic device 200.

While the movement due to the external force occurs in the electronic device 200, the processor 210 may identify the angle between the first housing 310 and the second housing 320. A graph 791 represents the angle between the first housing 310 and the second housing 320 over time.

The processor 210 may identify the state of the electronic device 200 based on the angle between the first housing 310 and the second housing 320. A graph 781 represents the state of the electronic device 200 over time.

Referring to the graph 781, the electronic device 200 may identify the state of the electronic device 200 over time. According to the graph 781, the processor 210 may identify the state of the electronic device 200 by using the inertial sensor 242 in a state in which the movement due to the external force occurs.

Referring to FIGS. 7A to 7D, regardless of whether the external force is applied to the electronic device 200, the processor 210 may identify the state of the electronic device 200. Thus, regardless of whether the external force is applied to the electronic device 200, the processor 210 may identify the state of the electronic device 200 based on the angle between the first housing 310 and the second housing 320 identified through the inertial sensor 242 (e.g., the first inertial sensor 242-1 and the second inertial sensor 242-2) of the electronic device 200.

According to an embodiment, while the electronic device 200 operates in a fourth mode 603-2, the state of the electronic device 200 may not be identified. A detailed description thereof will be described later through FIG. 12.

According to an embodiment, a malfunction of a hall sensor 241 may occur due to approach of an external object having magnetism. In the following specification, an embodiment for preventing a first display 231 from being deactivated due to the malfunction of the hall sensor 241 will be described.

Figure 8:
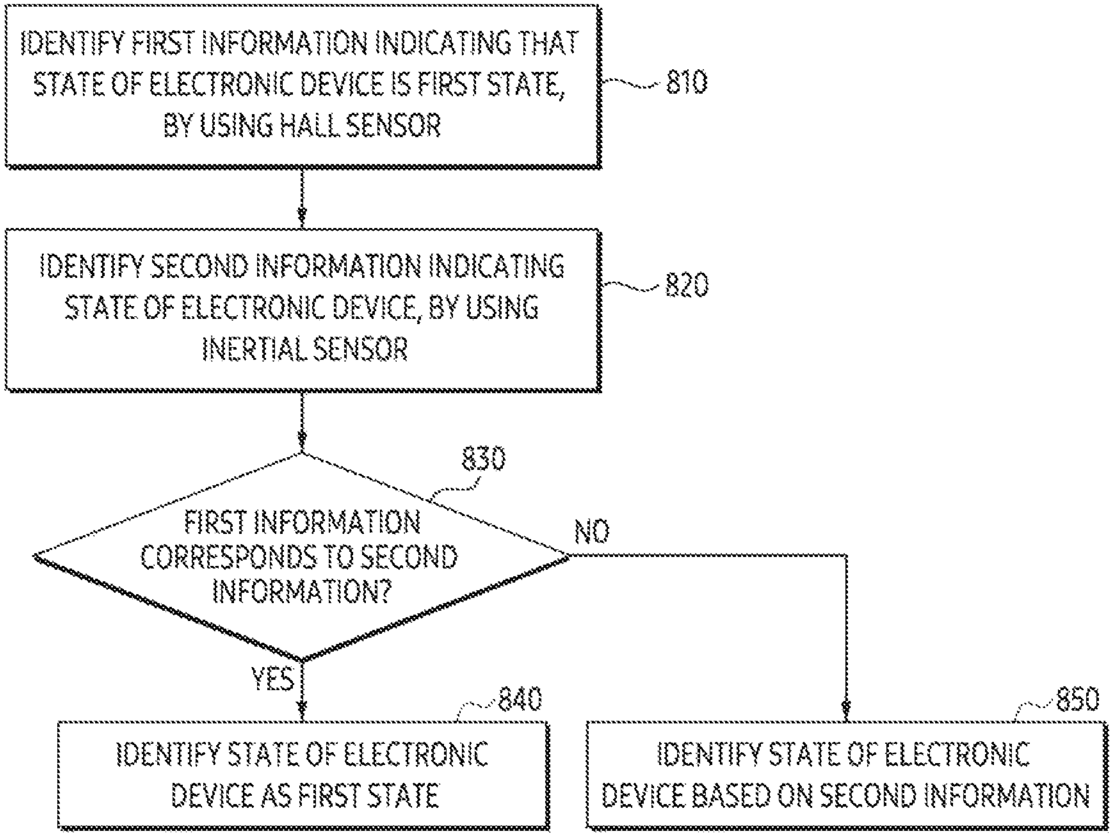
FIG. 8 illustrate a flowchart related to an operation of an electronic device according to an embodiment.

FIG. 8 illustrate a flowchart related to an operation of an electronic device according to an embodiment. In the following embodiment, each operation may be performed in sequence, but may be not performed in sequence. For example, an order of each operation may be changed, and at least two operations may be performed in parallel.

Referring to FIG. 8, in operation 810, the processor 210 may identify first information indicating that a state of an electronic device 200 is a first state (e.g., a state 601 of FIG. 6) by using a hall sensor 241.

According to an embodiment, the processor 210 may identify that the state of the electronic device 200 is the first state by using the hall sensor 241. For example, the processor 210 may identify that the state of the electronic device 200 is changed from one of a second state, a third state, and a fourth state to the first state by using the hall sensor 241.

According to an embodiment, the hall sensor 241 may identify that the state of the electronic device 200 is the first state based on approach of a magnetic material. For example, based on that an external object having magnetism different from the electronic device 200 approaches the hall sensor 241, the state of the electronic device 200 may be identified as the first state. According to the approach of the external object having the magnetism, the processor 210 may not properly identify the state of the electronic device 200. Thus, the processor 210 may identify whether the state of the electronic device 200 has been properly identified through following operations.

In operation 820, the processor 210 may identify second information indicating the state of the electronic device 200, by using an inertial sensor 242. For example, the processor 210 may identify the second information indicating the state of the electronic device 200 using the inertial sensor 242 based on identifying the first information. For example, in response to identifying the first information, the processor 210 may identify the second information indicating the state of the electronic device 200, by using the inertial sensor 242.

According to an embodiment, the processor 210 may identify the state of the electronic device 200 by using the inertial sensor 242. The processor 210 may identify an angle between a first housing 310 and a second housing 320 by using a first inertial sensor 242-1 and a second inertial sensor 242-2. The processor 210 may identify the state of the electronic device 200 based on the angle between the first housing 310 and the second housing 320.

For example, the processor 210 may identify the state of the electronic device 200 as one of a plurality of states based on the angle between the first housing 310 and the second housing 320. For example, the plurality of states may include first to fourth states. For example, the plurality of states may respectively correspond to a plurality of angles between the first housing 310 and the second housing 320.

According to an embodiment, the processor 210 may obtain data by using the inertial sensor 242. The data may be related to acceleration. For example, the processor 210 may identify first data by using the first inertial sensor 242-1. The processor 210 may identify second data by using the second inertial sensor 242-2. The processor 210 may identify the state of the electronic device 200 based on the first data and the second data. For example, the first data may mean data obtained through the first inertial sensor 242-1. For example, the first data may include data on acceleration and/or data on rotation obtained through the first inertial sensor 242-1. For example, the second data may mean data obtained through the second inertial sensor 242-2. For example, the second data may include data on acceleration and/or data on rotation obtained through the second inertial sensor 242-2.

In operation 830, the processor 210 may identify whether the first information corresponds to the second information. For example, the processor 210 may identify whether the first information corresponds to the second information, based on identifying the second information.

For example, the processor 210 may identify whether the first information corresponds to the second information, based on identifying whether the state of the electronic device 200 identified based on the second information is the first state. For example, the processor 210 may identify whether the first information corresponds to the second information, based on identifying whether the state of the electronic device 200 indicated by the second information is the first state.

In operation 840, in case that the first information corresponds to the second information, the processor 210 may identify the state of the electronic device 200 as the first state. For example, the processor 210 may identify the state of the electronic device 200 as the first state, based on identifying that the first information corresponds to the second information.

According to an embodiment, the processor 210 may perform an operation related to the first state. For example, the processor 210 may activate a second display 232 based on identifying the state of the electronic device 200 as the first state. The processor 210 may deactivate a first display 231 based on identifying the state of the electronic device 200 as the first state.

According to an embodiment, the processor 210 may identify that the state of the electronic device 200 identified based on the second information is the first state. The processor 210 may identify that the first information corresponds to the second information based on identifying that the state of the electronic device 200 identified based on the second information is the first state. According to an embodiment, the processor 210 may identify that the state of the electronic device 200 indicated by the second information is the first state. The processor 210 may identify that the first information corresponds to the second information based on identifying that the state of the electronic device 200 indicated by the second information is the first state.

For example, the processor 210 may identify the state of the electronic device 200 through the inertial sensor 242, in order to identify whether the first state identified through the hall sensor 241 is accurate. Based on identifying that the state of the electronic device 200 identified through the inertial sensor 242 corresponds to the state of the electronic device 200 identified through the hall sensor 241, the processor 210 may verify the state of the electronic device 200 identified through the hall sensor 241.

For example, the processor 210 may identify that no malfunction has occurred in the hall sensor 241, based on identifying that the first information corresponds to the second information.

In operation 850, in case that the first information is different from the second information, the processor 210 may identify the state of the electronic device 200 based on the second information. For example, the processor 210 may identify the state of the electronic device 200 based on the second information, based on identifying that the first information is different from the second information.

According to an embodiment, the processor 210 may identify that the state of the electronic device 200 identified based on the second information is one of the second state, the third state, and the fourth state. The processor 210 may identify that the first information is different from the second information, based on identifying that the state of the electronic device 200 identified based on the second information is one of the second state, the third state, and the fourth state. According to an embodiment, the processor 210 may identify that the state of the electronic device 200 indicated by the second information is one of the second state, the third state, and the fourth state. The processor 210 may identify that the first information is different from the second information, based on identifying that the state of the electronic device 200 indicated by the second information is one of the second state, the third state, and the fourth state.

For example, based on identifying that the state of the electronic device 200 identified through the inertial sensor 242 is different from the state of the electronic device 200 identified through the hall sensor 241, the processor 210 may identify that the state of the electronic device 200 identified through the hall sensor 241 is inaccurate.

For example, the processor 210 may identify that a malfunction has occurred in the hall sensor 241, based on identifying that the first information is different from the second information. For example, based on identifying that the first information is different from the second information, the processor 210 may identify that the malfunction has occurred in the hall sensor 241 as the external object having magnetism approaches the hall sensor 241.

According to an embodiment, the processor 210 may perform an operation according to the state of the electronic device 200 identified based on the second information. According to an embodiment, the processor 210 may identify the state of the electronic device 200 as one of the second state, the third state, and the fourth state, based on the second information. The processor 210 may provide a notification representing that the malfunction of the hall sensor 241 occurs. For example, the processor 210 may provide a notification representing that the external object having magnetism has approached within a designated distance from the hall sensor 241.

According to an embodiment, in order to prevent the malfunction of the hall sensor 241, the processor 210 may deactivate the hall sensor 241 based on identifying the state of the electronic device 200 as one of the third state and the fourth state. The processor 210 may activate the hall sensor 241 based on the state of the electronic device 200 changing from one of the third state and the fourth state to the second state. For example, the processor 210 may deactivate the hall sensor 241 in case that the electronic device 200 is in one of the third state and the fourth state, and may activate the hall sensor 241 in case of the second state.

According to an embodiment, the processor 210 may identify the state of the electronic device 200 based on the second information. For example, the processor 210 may activate the second display 232 based on identifying the state of the electronic device 200 as the second state. The processor 210 may deactivate the first display 231 based on identifying the state of the electronic device 200 as the second state.

According to an embodiment, the processor 210 may identify the state of the electronic device 200 as one of the third state and the fourth state. The processor 210 may activate the first display 231 based on identifying the state of the electronic device 200 as one of the third state and the fourth state. The processor 210 may deactivate the second display 232 based on identifying the state of the electronic device 200 as one of the third state and the fourth state.

For example, based on that the external object having magnetism approaches the hall sensor 241 of the electronic device 200, the processor 210 may identify the state of the electronic device 200 as the first state. Even though an actual state of the electronic device 200 is not the first state, the processor 210 may identify the state of the electronic device 200 as the first state according to the approach of the external object. The processor 210 may deactivate the first display 231 based on identifying the state of the electronic device 200 as the first state. This may cause inconvenience to the user. Thus, the processor 210 may verify the operation of the hall sensor 241 using the inertial sensor 242, based on identifying the state of the electronic device 200 as the first state through the hall sensor 241, through operations 810 to 850 described above.

Figure 9:
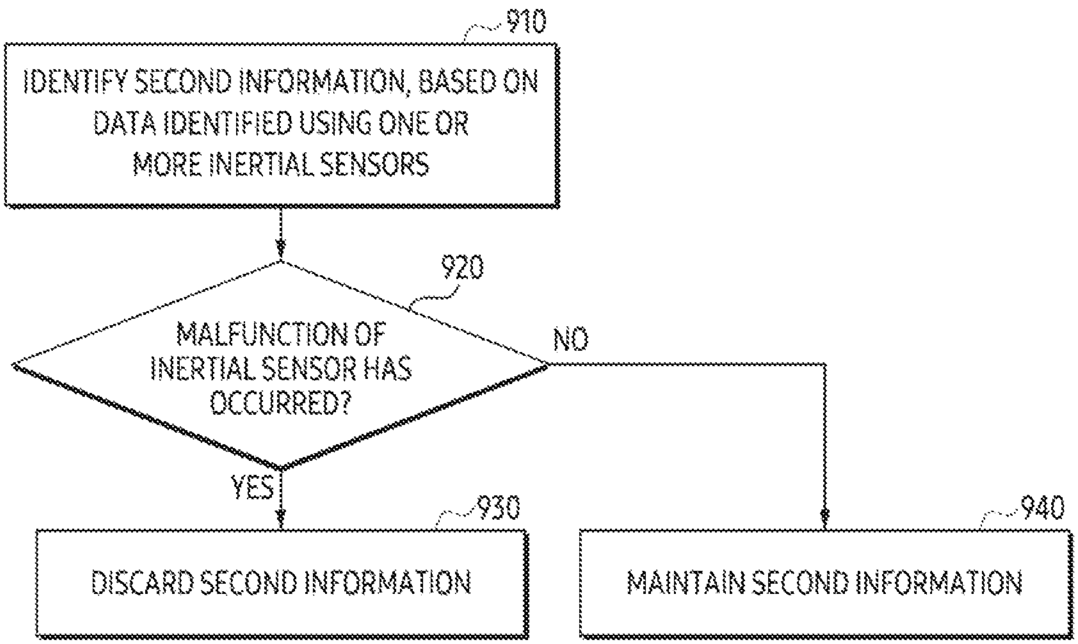
FIG. 9 illustrate a flowchart related to an operation of an electronic device according to an embodiment.

FIG. 9 illustrate a flowchart related to an operation of an electronic device according to an embodiment. In the following embodiment, each operation may be performed in sequence, but may be not performed in sequence. For example, an order of each operation may be changed, and at least two operations may be performed in parallel. Operations 910 to 940 described below may correspond to operation 820 of FIG. 8.

In operation 910, a processor 210 may identify second information based on data identified using an inertial sensor 242. For example, the processor 210 may obtain data using the inertial sensor 242. The data may be related to acceleration.

For example, the processor 210 may identify first data by using a first inertial sensor 242-1. The processor 210 may identify second data by using a second inertial sensor 242-2. The processor 210 may identify the second information based on the first data and the second data. For example, the processor 210 may identify a phase difference between a signal obtained through the first inertial sensor 242-1 and a signal obtained through the second inertial sensor 242-2. The processor 210 may identify an angle between a vector obtained through the first inertial sensor 242-1 and a vector obtained through the second inertial sensor 242-2. The processor 210 may identify an angle between a first housing 310 and a second housing 320, based on the phase difference and the angle between the vectors. The processor 210 may identify the second information indicating the state of the electronic device 200, based on the angle between the first housing 310 and the second housing 320.

In operation 920, the processor 210 may identify whether a malfunction of the inertial sensor 242 has occurred.

According to an embodiment, the processor 210 may identify whether the malfunction has occurred in the inertial sensor 242, based on identifying whether the state of the electronic device 200 indicated by the second information is different from a plurality of states. In case that the state of the electronic device 200 indicated by the second information is different from the plurality of states, the processor 210 may identify that the malfunction has occurred in the inertial sensor 242. In case that the state of the electronic device 200 indicated by the second information is identified as one of the plurality of states, the processor 210 may identify that no malfunction has occurred in the inertial sensor 242.

For example, the processor 210 may identify that the state of the electronic device 200 identified through the inertial sensor 242 is different from the plurality of states, based on identifying that the angle between the first housing 310 and the second housing 320 identified through the inertial sensor 242 deviates from a designated range (e.g., greater than equal to about 0 degrees and less than or equal to about 180 degrees). For example, the processor 210 may identify the state of the electronic device 200 as one of the plurality of states based on identifying that the angle between the first housing 310 and the second housing 320 identified through the inertial sensor 242 is within the designated range (e.g., greater than equal to about 0 degrees and less than or equal to about 180 degrees).

According to an embodiment, the processor 210 may identify information representing validity of the inertial sensor 242 from the inertial sensor 242. The processor 210 may identify whether the malfunction of the inertial sensor 242 has occurred, based on the information representing the validity of the inertial sensor 242.

For example, in case that normal data is obtained through the inertial sensor 242, the angle between the first housing 310 and the second housing 320 identified by the inertial sensor 242 may be identified within the designated range (e.g., greater than equal to about 0 degrees and less than or equal to about 180 degrees). Based on that the inertial sensor 242 obtains the normal data, the processor 210 may identify, from the inertial sensor 242, information (e.g., a first value) representing that the data obtained by the inertial sensor 242 is valid.

For example, in case that abnormal data is obtained through the inertial sensor 242, the angle between the first housing 310 and the second housing 320 identified by the inertial sensor 242 may be identified as being outside the designated range (e.g., greater than equal to about 0 degrees and less than or equal to about 180 degrees). Based on that the inertial sensor 242 obtains the abnormal data, the processor 210 may identify, from the inertial sensor 242, information (e.g., a second value) representing that the data obtained by the inertial sensor 242 is invalid.

According to an embodiment, the processor 210 may activate the inertial sensor 242 based on the obtaining of the first information. Even after the inertial sensor 242 is activated, the processor 210 may not obtain the second information through the inertial sensor 242. In case that the second information is not obtained for a designated time (e.g., 1 second) from timing when the inertial sensor 242 is activated, the processor 210 may identify the malfunction of the inertial sensor 242.

In operation 930, in case that the malfunction of the inertial sensor 242 occurs, the processor 210 may discard the second information. For example, the processor 210 may discard the second information, based on identifying that the malfunction has occurred in the inertial sensor 242.

For example, the processor 210 may not perform operation 830 of FIG. 8 based on discarding the second information. For example, the processor 210 may discard the second information and may identify the state of the electronic device 200 as the first state based on the first information. The processor 210 may perform an operation related to the first state based on identifying the state of the electronic device 200 as the first state.

For example, the processor 210 may identify that the malfunction has occurred in the inertial sensor 242, based on identifying that the data obtained through the inertial sensor 242 is invalid. The processor 210 may discard the second information, based on identifying that the malfunction has occurred in the inertial sensor 242. The processor 210 may discard the second information and may identify the state of the electronic device 200 as the first state. The processor 210 may identify that the first information identified through the hall sensor 241 may not be verified, through the inertial sensor 242. The processor 210 may identify the state of the electronic device 200 as the first state, based on the first information identified through the hall sensor 241.

In operation 940, the processor 210 may maintain the second information, based on identifying that no malfunction of the inertial sensor 242 occurs. The processor 210 may perform operation 830 of FIG. 8, based on identifying the second information. For example, the processor 210 may identify whether the first information corresponds to the second information, based on identifying the second information.

Figure 10:
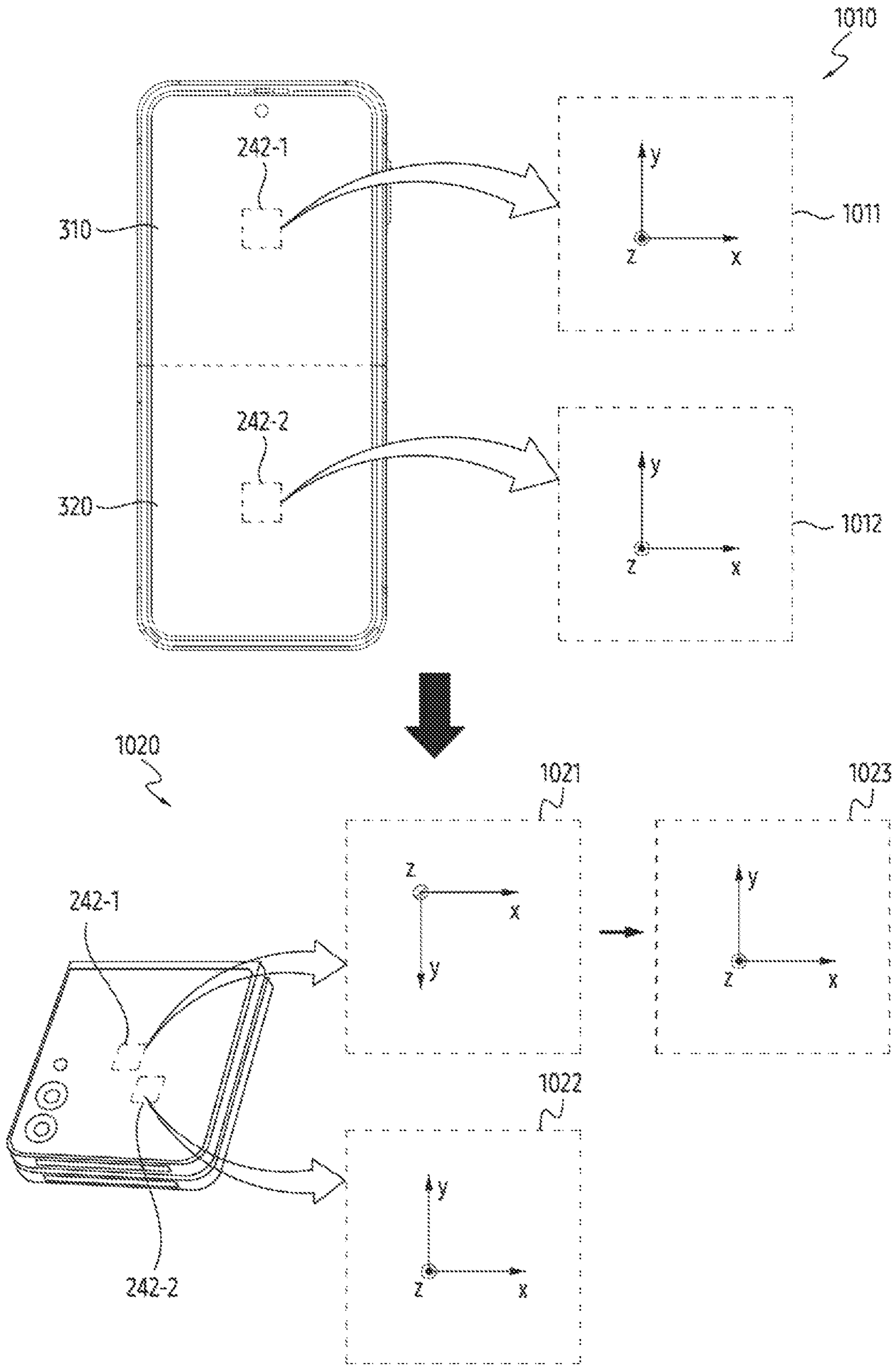
FIG. 10 illustrates an example of an operation of an electronic device for changing an axis of an inertial sensor according to an embodiment.

FIG. 10 illustrates an example of an operation of an electronic device for changing an axis of an inertial sensor according to an embodiment.

Referring to FIG. 10, in a state 1010 and a state 1020, an electronic device 200 may include a first inertial sensor 242-1 and a second inertial sensor 242-2. The first inertial sensor 242-1 may be disposed within a first housing 310. The second inertial sensor 242-2 may be disposed within a second housing 320.

The state 1010 may represent the electronic device 200 in a fourth state. In the state 1010, the processor 210 may identify a posture of the electronic device 200 by using the first inertial sensor 242-1. The processor 210 may use the second inertial sensor 242-2 as an auxiliary inertial sensor for identifying the posture of the electronic device 200. The processor 210 may identify a state of the electronic device 200 by using the first inertial sensor 242-2 and the second inertial sensor 242-2.

For example, a plurality of axes of the first inertial sensor 242-1 may be configured as in an example 1011. In the example 1011, an x-axis of the first inertial sensor 242-1 may be configured to be parallel to an axis between the first housing 310 and the second housing 320. A z-axis of the first inertial sensor 242-1 may be configured in a direction in which a first display 231 faces. A y-axis of the first inertial sensor 242-1 may be configured in a direction perpendicular to the x-axis and the z-axis.

For example, a plurality of axes of the second inertial sensor 242-2 may be configured as in an example 1012. In the example 1012, the plurality of axes of the second inertial sensor 242-2 may be configured the same as the plurality of axes of the first inertial sensor 242-1.

In the state 1020, the processor 210 may identify that the state of the electronic device 200 is changed from the fourth state to a first state. For example, the processor 210 may identify the state of the electronic device 200 as the first state, based on operations 810 to 840. The processor 210 may change at least one axis related to the first inertial sensor 242-1, based on identifying the state of the electronic device 200 as the first state.

For example, as the first housing 310 rotates with respect to the axis between the first housing 310 and the second housing 320, directions of the plurality of axes of the first inertial sensor 242-1 may be changed. The plurality of axes of the first inertial sensor 242-1 may be configured as in an example 1021. In case that the plurality of axes are configured as in the example 1021, a display direction of the second display 232 may be set to be opposite. Thus, the processor 210 may change the plurality of axes of the first inertial sensor 242-1 as in an example 1023. For example, the processor 210 may configure the plurality of axes of the first inertial sensor 242-1 to be the same as the plurality of axes of the second inertial sensor 242-2 of an example 1022. For example, the processor 210 may set the directions of the y-axis and z-axis of the first inertial sensor 242-1 to be opposite.

For example, as the state of the electronic device 200 is changed from the fourth state to the first state, the processor 210 may maintain an inertial sensor for identifying the posture of the electronic device 200 as the first inertial sensor 242-1. In case that the inertial sensor for identifying the posture of the electronic device 200 is changed according to a state change of the electronic device 200, a delay may occur, and data obtained immediately after the inertial sensor is activated may be inaccurate. Thus, the processor 210 may maintain the inertial sensor for identifying the posture of the electronic device 200 as the first inertial sensor 242-1 according to the state change of the electronic device 200.

According to an embodiment, while the state of the electronic device 200 is in the first state, the processor 210 may change a display mode of the second display 232 by using the first inertial sensor 242-1. For example, the processor 210 may identify using the first inertial sensor 242-1 that the second display 232 rotates about 180 degrees according to rotation of the electronic device 200, while the electronic device 200 is in the first state. Based on identifying that the second display 232 rotates about 180 degrees, the processor 210 may rotate (e.g., rotate 180 degrees) the screen displayed through the second display 232.

Figure 11:
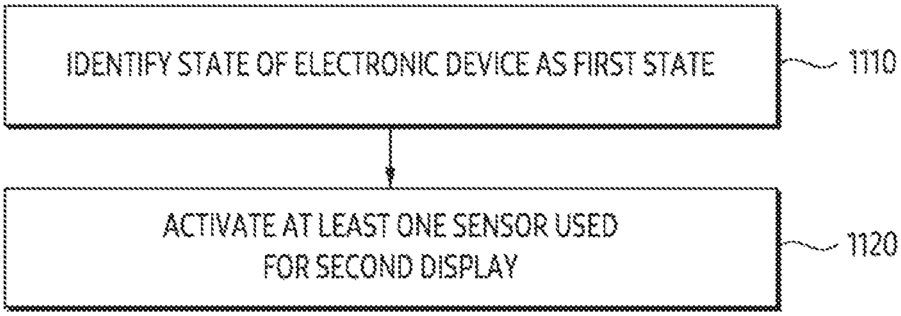
FIG. 11 illustrate a flowchart related to an operation of an electronic device according to an embodiment.

FIG. 11 illustrate a flowchart related to an operation of an electronic device according to an embodiment. In the following embodiment, each operation may be performed in sequence, but may be not performed in sequence. For example, an order of each operation may be changed, and at least two operations may be performed in parallel.

In operation 1110, a processor 210 may identify a state of an electronic device 200 as a first state. The operation 1110 may correspond to operation 840 of FIG. 8.

In operation 1120, the processor 210 may activate at least one sensor used for a second display 232. For example, the processor 210 may activate the at least one sensor used for the second display 232 of a sensor 240 (or a plurality of sensors) based on identifying the state of the electronic device 200 as the first state.

According to an embodiment, the sensor 240 may include a hall sensor 241 and an inertial sensor 242 illustrated in FIG. 2. The sensor 240 may include various sensors as well as the hall sensor 241 and the inertial sensor 242. For example, the sensor 240 may include a proximity sensor and/or an illuminance sensor. For example, the proximity sensor may include a first proximity sensor for a first display 231 and a second proximity sensor for the second display 232. While the first display 231 is activated, the first proximity sensor may be used. While the second display 232 is activated, the second proximity sensor may be used. The first proximity sensor may be disposed in a direction in which the first display 231 faces. The second proximity sensor may be disposed in a direction in which the second display 232 faces.

For example, the illuminance sensor may include a first illuminance sensor for the first display 231 and a second illuminance sensor for the second display 232. While the first display 231 is activated, the first illumination sensor may be used. While the second display 232 is activated, the second illuminance sensor may be used. The first illuminance sensor may be disposed in the direction that the first display 231 faces. The second illuminance sensor may be disposed in the direction that the second display 232 faces.

For example, the processor 210 may activate the second proximity sensor and the second illuminance sensor and may deactivate the first proximity sensor and the first illuminance sensor, based on identifying the state of the electronic device 200 as the first state. As the second display 232 is activated, the processor 210 may activate the second proximity sensor and the second illuminance sensor.

Figure 12A:
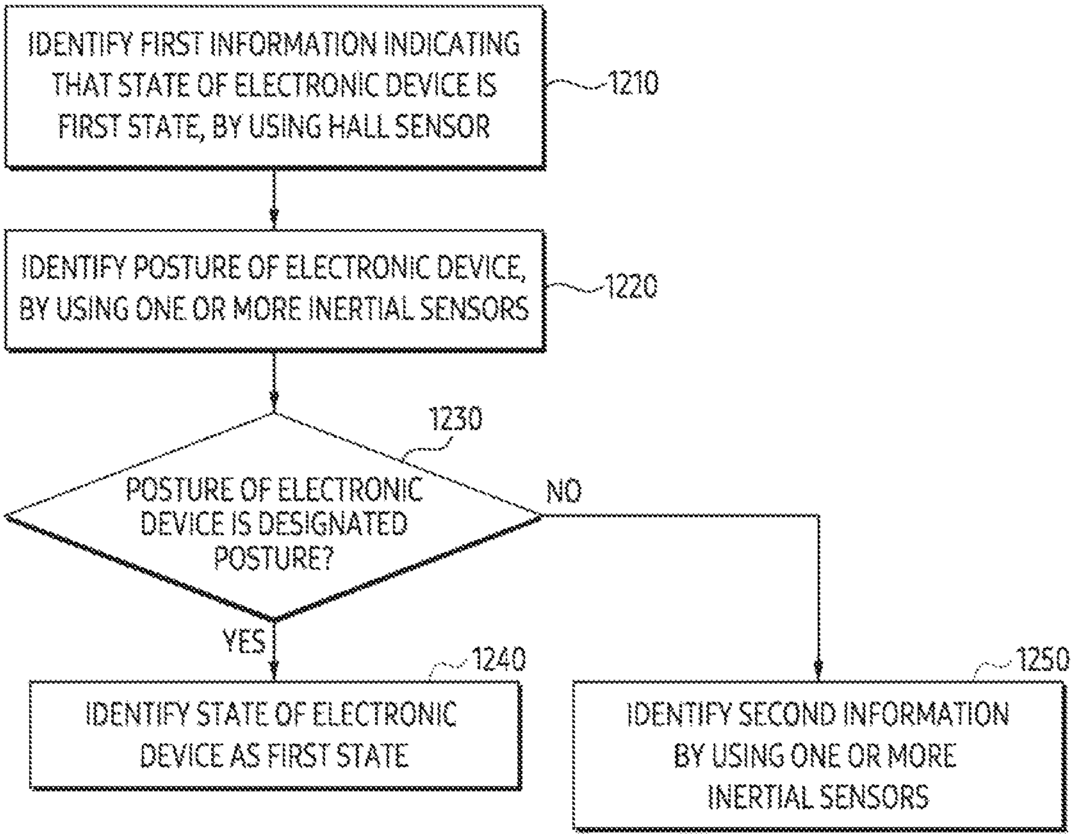
FIG. 12A illustrate a flowchart related to an operation of an electronic device according to an embodiment.

FIG. 12A illustrate a flowchart related to an operation of an electronic device according to an embodiment. In the following embodiment, each operation may be performed in sequence, but may be not performed in sequence. For example, an order of each operation may be changed, and at least two operations may be performed in parallel.

Referring to FIG. 12A, in operation 1210, a processor 210 may identify first information indicating that a state of an electronic device 200 is a first state by using a hall sensor 241. For example, the processor 210 may identify the first information indicating that the state of the electronic device 200 is the first state based on the hall sensor 241. For example, the operation 1210 may correspond to operation 810 of FIG. 8.

In operation 1220, the processor 210 may identify a posture of the electronic device 200, by using an inertial sensor 242 (e.g., a first inertial sensor 242-1 and a second inertial sensor 242-2). For example, the processor 210 may identify the posture of the electronic device 200, by using the inertial sensor 242, based on identifying the first information.

For example, the processor 210 may identify a mode according to the posture of the electronic device 200. The processor 210 may identify the mode of the electronic device 200 based on the state of the electronic device 200 and the posture of the electronic device 200. For example, the processor 210 may identify the mode of the electronic device 200 as one of a first mode 602-1, a second mode 602-2, a third mode 603-1, and a fourth mode 603-2 illustrated in FIG. 6.

In operation 1230, the processor 210 may identify whether the posture of the electronic device 200 is a designated posture. For example, the designated posture may be referred to as the posture of the electronic device 200 in which in a direction 391 in which a first display area 331 faces and a direction 392 in which a second display area 332 faces are parallel to the ground. For example, the processor 210 may identify a posture according to a fourth mode 603-2 of FIG. 6 as the designated posture.

In operation 1240, in case that the posture of the electronic device 200 is the designated posture, the state of the electronic device 200 may be identified as the first state. For example, the processor 210 may identify the state of the electronic device 200 as the first state, based on identifying that the posture of the electronic device 200 is the designated posture.

According to an embodiment, the processor 210 may identify an angle between a first housing 310 and a second housing 320 by using the first inertial sensor 242-1 and the second inertial sensor 242-2. For example, in case that acceleration changes in at least two axial directions identified by the first inertial sensor 242-1 and the second inertial sensor 242-2 occur, the angle between the first housing 310 and the second housing 320 may be identified. In case that the state of the electronic device 200 is changed while the electronic device 200 is in the designated posture, acceleration changes in at least two axial directions identified by the first inertial sensor 242-1 and the second inertial sensor 242-2 may not occur. While the electronic device 200 is in the designated posture, the angle between the first housing 310 and the second housing 320 identified through the inertial sensor 242 may be inaccurate. The processor 210 may not use the angle between the first housing 310 and the second housing 320 identified through the inertial sensor 242, while the electronic device 200 is in the designated posture.

In operation 1250, in case that the posture of the electronic device 200 is not the designated posture, second information may be identified by using the inertial sensor 242. For example, the processor 210 may identify the second information by using the inertial sensor 242, based on identifying that the posture of the electronic device 200 is not the designated posture. The operation 1250 may correspond to operation 820 of FIG. 8. The processor 210 may perform operations 830 to 850 of FIG. 8 after performing the operation 1250.

Figure 12B:
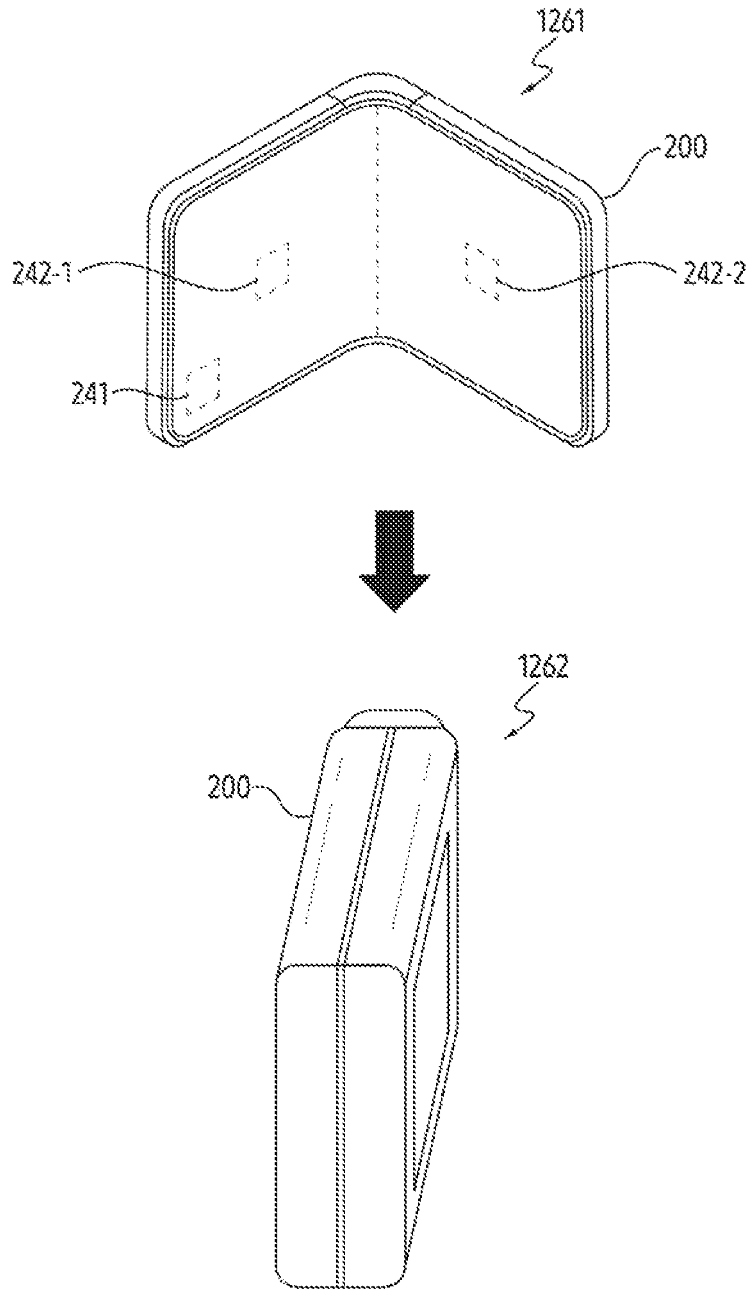
FIG. 12B illustrates an example of an operation of an electronic device in a designated posture according to an embodiment.

FIG. 12B illustrates an example of an operation of an electronic device in a designated posture according to an embodiment.

Referring to FIG. 12B, in an example 1261, a posture of an electronic device 200 may operate in a designated posture. For example, a processor 210 may identify that the posture of the electronic device 200 is a posture in which a direction 391 in which a first display area 331 faces and a direction 392 in which a second display area 332 faces are parallel to the ground.

According to an embodiment, while the posture of the electronic device 200 is the designated posture, the electronic device 200 may operate in a fourth mode (e.g., a fourth mode 603-2 of FIG. 6). For example, a first inertial sensor 242-1 may be used to identify a vector for gravitational acceleration, based on a three-axis direction (e.g., a three-axis direction of an example 1011 or a three-axis direction of an example 1021 of FIG. 10), in a state of disposing within a first housing 310. The second inertial sensor 242-2 may be used to identify the vector for the gravitational acceleration, based on a three-axis direction (e.g., a three-axis direction of an example 1012 and an example 1022 of FIG. 10), in a state of disposing within a second housing 320.

For example, a state of the electronic device 200 may be changed to a fourth state. After the state of the electronic device 200 is changed to the fourth state, the electronic device 200 may be configured as in an example 1262.

In the example 1262, the processor 210 may identify a change in a direction of the gravitational acceleration, based on the three-axis direction, by using the first inertial sensor 242-1, in order to identify a state change of the electronic device 200. In order to identify the state change of the electronic device 200, the processor 210 may identify a change in the vector for the gravitational acceleration, based on the three-axis direction, by using the second inertial sensor 242-2. The change in the vector for the gravitational acceleration identified through the first inertial sensor 242-1 may be identified.

While the posture of the electronic device 200 is in a designated state, the vector for the gravitational acceleration may be maintained in an axial direction between the first housing 310 and the second housing 320. Thus, even in case that the state of the electronic device 200 is changed while the posture of the electronic device 200 is in the designated state, the change in the vector for the gravitational acceleration identified through the first inertial sensor 242-1 and the second inertial sensor 242-2 may not be identified.

For example, the processor 210 may identify an angle between the first housing 310 and the second housing 320, based on a change in data obtained through an inertial sensor 242 that changes over time. Even in case that the angle between the first housing 310 and the second housing 320 is changed while the posture of the electronic device 200 is in the designated posture, the data obtained through the inertial sensor 242 may not be changed.

Thus, while the posture of the electronic device 200 is in the designated state, the processor 210 may not identify the angle between the first housing 310 and the second housing 320 through the first inertial sensor 242-1 and the second inertial sensor 242-2. The electronic device 200 may identify that the state of the electronic device 200 is changed to a first state, by using a hall sensor 241.

According to an embodiment, in case that the posture of the electronic device 200 is not maintained in the designated state, the processor 210 may identify the angle between the first housing 310 and the second housing 320 through the first inertial sensor 242-1 and the second inertial sensor 242-2.

According to an embodiment, an electronic device (e.g., an electronic device 200) may comprise a first housing (e.g., a first housing 310), a second housing (e.g., a second housing 320), a hinge foldably or rotatably connecting the first housing to the second housing along a folding axis (e.g., a folding axis 337), a plurality of sensors (e.g., a sensor 240) comprising a hall sensor (e.g., a hall sensor 241) and at least one inertial sensor (e.g., a sensor 242), and at least one processor (e.g., a processor 210) operably coupled to the plurality of sensors. The at least one processor may be configured to identify, using the hall sensor, first information indicating that a state of the electronic device is a first state. The at least one processor may be configured to, based on identifying the first information, identify, using the at least one inertial sensor, second information indicating the state of the electronic device. The at least one processor may be configured to, based on identifying that the first information corresponds to the second information, identify the state of the electronic device as the first state. Based on identifying that the first information is different from the second information, the at least one processor may be configured to identify, based on the second information, the state of the electronic device.

According to an embodiment, the electronic device may include a first display (e.g., a first display 231) having a first display area corresponding to a surface of the first housing and a second display area corresponding to a surface of the second housing, the first display area and the second display area being divided along the folding axis, and a second display (e.g., a second display 232) comprising a third display area opposite to the first display area, in the first housing.

According to an embodiment, the at least one processor may be configured to identify, based on data obtained using the at least one inertial sensor, the second information. The at least one processor may be configured to identify that the state of the electronic device indicated by the second information is different from a plurality of states including the first state. The at least one processor may be configured to, based on identifying that the state of the electronic device indicated by the second information is different from the plurality of states, identify the state of the electronic device as the first state.

According to an embodiment, the plurality of states may respectively correspond to a plurality of angles between the first housing and the second housing.

According to an embodiment, the plurality of states may comprise the first state, a second state, a third state, and a fourth state. The first state may correspond to a first angle between a first direction (in which the first display area faces) and a second direction (in which the second display area faces), which is greater than or equal to a first predetermined angle. The second state may correspond to a second angle between the first direction and the second direction, which is greater than or equal to a second predetermined angle and less than the first predetermined angle. The third state may correspond to a third angle between the first direction and the second direction, which is greater than or equal to a third predetermined angle and less than the second predetermined angle. The fourth state may correspond to a fourth angle between the first direction and the second direction, is less than the predetermined third angle.

According to an embodiment, the at least one processor may be configured to, based on identifying the state of the electronic device as one of the first state and the second state, activate the second display. The at least one processor may be configured to, based on identifying the state of the electronic device as one of the third state and the fourth state, activate the first display.

According to an embodiment, the at least one processor may be configured to, based on identifying the state of the electronic device as one of the third state and the fourth state, deactivate the hall sensor. The at least one processor may be configured to, based on the state of the electronic device being changed from one of the third state and the fourth state to the second state, activate the hall sensor.

According to an embodiment, the at least one inertial sensor may comprise a first inertial sensor disposed in the first housing and a second inertial sensor disposed in the second housing. The at least one processor may be configured to, based on identifying the state of the electronic device as the first state, change at least one axis related to the first inertial sensor.

According to an embodiment, the at least one processor may be configured to change a first direction of the at least one axis among a plurality of axes related to the first inertial sensor to a second direction that is opposite to the first direction.

According to an embodiment, the at least one processor may be configured to change, using the first inertial sensor, a display mode of the second display while the state of the electronic device is the first state.

According to an embodiment, the at least one processor may be configured to, based on identifying the state of the electronic device as the first state, activate at least one sensor used for the second display, among the plurality of sensors.

According to an embodiment, the plurality of sensors may comprise a first illuminance sensor disposed in a direction that the first display faces and a second illuminance sensor disposed in a direction that the second display faces. The at least one processor may be configured to, based on identifying the state of the electronic device as the first state, activate the second illuminance sensor and deactivate the first illuminance sensor.

According to an embodiment, the at least one processor may be configured to, based on identifying that the state of the electronic device indicated by the second information is the first state, identify that the first information corresponds to the second information.

According to an embodiment, the at least one processor may be configured to identify, using the at least one inertial sensor, a posture of the electronic device. The at least one processor may be configured to identify the first information while the posture of the electronic device is a designated posture. The at least one processor may be configured to, based on the first information, identify the state of the electronic device as the first state.

According to an embodiment, the at least one processor may be configured to identify the first information while the posture of the electronic device is different from the designated posture. The at least one processor may be configured to, based on identifying the first information, obtain, using the at least one inertial sensor, the second information indicating the state of the electronic device.

According to an embodiment, a method of an electronic device (e.g., an electronic device 200) may comprise identifying, using a hall sensor (e.g., a hall sensor 241) of the electronic device, first information indicating that a state of the electronic device is a first state. The method may comprise, based on identifying the first information, identifying, using at least one inertial sensor (e.g., an inertial sensor 242) of the electronic device, second information indicating the state of the electronic device. The method may comprise, based on identifying that the first information corresponds to the second information, identifying the state of the electronic device as the first state. The method may comprise, based on identifying that the first information is different from the second information, identifying, based on the second information, the state of the electronic device.

According to an embodiment, the method may comprise, identifying, based on identifying that the state of the electronic device identified based on the second information is the first state, that the first information corresponds to the second information.

According to an embodiment, the method may comprise identifying, using the at least one inertial sensor, a posture of the electronic device. The method may comprise identifying the first information while the posture of the electronic device is a designated posture. The method may comprise, based on the first information, identifying the state of the electronic device as the first state.

According to an embodiment, the method may comprise identifying the first information while the posture of the electronic device is different from the designated posture. The method may comprise, based on identifying the first information, obtaining, using the at least one inertial sensor, the second information indicating the state of the electronic device.

According to an embodiment, a non-transitory computer readable storage medium may store one or more programs. The one or more programs may comprise instructions which, when being executed by at least one processor (e.g., a processor 210) of an electronic device with a plurality of sensors (e.g., a sensor 240) including a hall sensor (e.g., a hall sensor 241) and at least one inertial sensor (e.g., an inertial sensor 242), cause the electronic device to identify, using the hall sensor, first information indicating that a state of the electronic device is a first state. The one or more programs may comprise instructions which, when being executed by at least one processor, cause the electronic device to, based on identifying the first information, identify, using the at least one inertial sensor, second information indicating the state of the electronic device. The one or more programs may comprise instructions which, when being executed by at least one processor, cause the electronic device to, based on identifying that the first information corresponds to the second information, identify the state of the electronic device as the first state. The one or more programs may comprise instructions which, when being executed by at least one processor, cause the electronic device to, based on identifying that the first information is different from the second information, identify, based on the second information, the state of the electronic device.

According to an embodiment, an electronic device (e.g., an electronic device 200) may comprise a first housing (e.g., a first housing 310), a second housing (e.g., a second housing 320), a hinge foldably or rotatably connecting the first housing to the second housing along a folding axis, a plurality of sensors comprising a hall sensor (e.g., a hall sensor 241) and at least one inertial sensor (e.g., an inertial sensor 242), and at least one processor (e.g., a processor 210) operably coupled to the plurality of sensors. The at least one processor may be configured to identify, using the hall sensor, first information indicating that a state of the electronic device is a first state. The at least one processor may be configured to, based on identifying the first information, identify, using the at least one inertial sensor, a posture of the electronic device. The at least one processor may be configured to, while the posture of the electronic device is a designated posture, identify the state of the electronic device as the first state. The at least one processor may be configured to, while the posture of the electronic device is at least one posture different from the designated posture, identify the state of the electronic device based on the second information identified using the at least one inertial sensor.

According to the above-described embodiment, the processor 210 of the electronic device 200 may supplement the malfunction of the hall sensor 241 by additionally using the inertial sensor 242. According to the above-described embodiment, since the accuracy of the hall sensor 241 increases, an error related to an operation of identifying the state of the electronic device 200 may be prevented.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
- a first housing;
- a second housing;
- a hinge foldably connecting the first housing and the second housing to each other along a folding axis;
- a plurality of sensors comprising a hall sensor and at least one inertial sensor; and
- at least one processor comprising processing circuitry, wherein the at least one processor is configured to:
  - identify, using the hall sensor, first information indicating that a state of the electronic device is a first state,
  - based on identifying the first information, identify, using the at least one inertial sensor, second information indicating the state of the electronic device,
  - identify whether the first information corresponds to or is different from the second information,
  - based on identifying that the first information corresponds to the second information, identify the state of the electronic device as the first state, and
  - based on identifying that the first information is different from the second information, identify the state of the electronic device based on the second information.

2. The electronic device of claim 1, wherein the electronic device further comprises:
- a first display comprising a first display area corresponding to a first surface of the first housing and a second display area corresponding to a surface of the second housing, wherein the first display area and the second display area are divided along the folding axis, and
- a second display comprising a display area corresponding to a second surface of the first housing opposite to the first surface of the first housing.

3. The electronic device of claim 2, wherein the at least one processor is further configured to:
- identify the second information based on data obtained using the at least one inertial sensor,
- identify that the state of the electronic device indicated by the second information is different from a plurality of states comprising the first state, and
- based on identifying that the state of the electronic device indicated by the second information is different from the plurality of states, identify the state of the electronic device as the first state.

4. The electronic device of claim 3, wherein the plurality of states respectively correspond to a plurality of angles between the first housing and the second housing.

5. The electronic device of claim 4, wherein the plurality of states further comprises a second state, a third state, and a fourth state,
- wherein the first state corresponds to a first angle between a first direction in which the first display area faces and a second direction in which the second display area faces, the first angle being greater than or equal to a first predetermined angle,
- wherein the second state corresponds to a second angle between the first direction and the second direction, the second angle being greater than or equal to a second predetermined angle and less than the first predetermined angle,
- wherein the third state corresponds to a third angle between the first direction and the second direction, the third angle being greater than or equal to a third predetermined angle and less than the second predetermined angle, and
- wherein the fourth state corresponds to a fourth angle between the first direction and the second direction, the fourth angle being less than the third predetermined angle.

6. The electronic device of claim 5, wherein the at least one processor is further configured to:
- based on identifying the state of the electronic device as one of the first state and the second state, activate the second display, and
- based on identifying the state of the electronic device as one of the third state and the fourth state, activate the first display.

7. The electronic device of claim 5, wherein the at least one processor is further configured to:

based on identifying the state of the electronic device as one of the third state and the fourth state, deactivate the hall sensor, and based on the state of the electronic device being changed from one of the third state and the fourth state to the second state, activate the hall sensor.

8. The electronic device of claim 2, wherein the at least one inertial sensor comprises a first inertial sensor in the first housing and a second inertial sensor in the second housing, and wherein the at least one processor is further configured to, based on identifying the state of the electronic device as the first state, change at least one axis among a plurality of axes related to the first inertial sensor.

9. The electronic device of claim 8, wherein the at least one processor is further configured to change a first direction of the at least one axis to a second direction that is opposite to the first direction.

10. The electronic device of claim 8, wherein the at least one processor is further configured to change, using the first inertial sensor, a display mode of the second display while the state of the electronic device is the first state.

11. The electronic device of claim 2, wherein the at least one processor is further configured to, based on identifying the state of the electronic device as the first state, activate, among the plurality of sensors, at least one sensor configured to be used for the second display.

12. The electronic device of claim 11, wherein the plurality of sensors comprises a first illuminance sensor in a direction that the first display faces and a second illuminance sensor in a direction that the second display faces, and wherein the at least one processor is further configured to, based on identifying the state of the electronic device as the first state, activate the second illuminance sensor and deactivate the first illuminance sensor.

13. The electronic device of claim 1, wherein the at least one processor is further configured to, based on identifying that the state of the electronic device indicated by the second information is the first state, identify that the first information corresponds to the second information.

14. The electronic device of claim 1, wherein the at least one processor is further configured to:

identify, using the at least one inertial sensor, a posture of the electronic device, identify the first information while the posture of the electronic device is a designated posture, and based on the first information, identify the state of the electronic device as the first state.

15. The electronic device of claim 14, wherein the at least one processor is further configured to:

identify the first information while the posture of the electronic device is different from the designated posture, and based on identifying the first information, obtain, using the at least one inertial sensor, the second information indicating the state of the electronic device.

16. A method of an electronic device comprising:

identifying, using a hall sensor of the electronic device, first information indicating that a state of the electronic device is a first state;

based on identifying the first information, identifying, using at least one inertial sensor of the electronic device, second information indicating the state of the electronic device;

identifying whether the first information corresponds to or is different from the second information;

based on identifying that the first information corresponds to the second information, identifying the state of the electronic device as the first state; and based on identifying that the first information is different from the second information, identifying the state of the electronic device based on the second information.

17. The method of claim 16, further comprising identifying, based on identifying that the state of the electronic device identified based on the second information is the first state, that the first information corresponds to the second information.

18. The method of claim 16, further comprising:

identifying, using the at least one inertial sensor, a posture of the electronic device;

identifying the first information while the posture of the electronic device is a designated posture; and based on the first information, identifying the state of the electronic device as the first state.

19. The method of claim 18, further comprising:

identifying the first information while the posture of the electronic device is different from the designated posture; and based on identifying the first information, obtaining, using the at least one inertial sensor, the second information indicating the state of the electronic device.

20. A non-transitory computer readable storage medium storing one or more programs, wherein the one or more programs comprise instructions which, when being executed by at least one processor of an electronic device, cause the electronic device to:

identify, using a hall sensor of the electronic device, first information indicating that a state of the electronic device is a first state;

based on identifying the first information, identify, using at least one inertial sensor of the electronic device, second information indicating the state of the electronic device;

identifying whether the first information corresponds to or is different from the second information;

based on identifying that the first information corresponds to the second information, identify the state of the electronic device as the first state; and based on identifying that the first information is different from the second information, identify the state of the electronic device based on the second information.

* * * * *